(12) United States Patent
Mo et al.

(10) Patent No.: US 12,491,802 B2
(45) Date of Patent: Dec. 9, 2025

(54) SIDE IMPACT PROTECTION MECHANISM

(71) Applicant: BAMBINO PREZIOSO SWITZERLAND AG, Steinhausen (CH)

(72) Inventors: Xiaolong Mo, Guangdong (CN); Kun Zhang, Guangdong (CN); Da Liang Zhang, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/013,855

(22) PCT Filed: Jun. 30, 2021

(86) PCT No.: PCT/EP2021/068021
§ 371 (c)(1),
(2) Date: Dec. 29, 2022

(87) PCT Pub. No.: WO2022/003034
PCT Pub. Date: Jan. 6, 2022

(65) Prior Publication Data
US 2024/0010106 A1    Jan. 11, 2024

(30) Foreign Application Priority Data
Jun. 30, 2020    (CN) .......................... 202010617642.1

(51) Int. Cl.
*B60N 2/28* (2006.01)
(52) U.S. Cl.
CPC .......... *B60N 2/2887* (2013.01); *B60N 2/2872* (2013.01); *B60N 2/2884* (2013.01)
(58) Field of Classification Search
CPC .......................... B60N 2/2884; B60R 21/2072
(Continued)

(56) References Cited

U.S. PATENT DOCUMENTS

| | | | |
|---|---|---|---|
| 114,655 | A | 5/1871 | Dubrul |
| 3,829,158 | A | 8/1974 | O'Connor |

(Continued)

FOREIGN PATENT DOCUMENTS

| | | |
|---|---|---|
| AU | 2018217211 A1 | 2/2019 |
| CA | 3077919 A1 | 10/2020 |

(Continued)

OTHER PUBLICATIONS

PCT International Search Report and Written Opinion; International Application No. PCT/EP2021/068021; International Filing Date: Jun. 30, 2021; Date Mailed: Sep. 14, 2021; pp. 1-9.

(Continued)

*Primary Examiner* — Jose V Chen
(74) *Attorney, Agent, or Firm* — CANTOR COLBURN LLP

(57) ABSTRACT

A side impact protection mechanism is provided and is disposed on a lateral wing of any component of a child carrier and includes a side impact protection block, a locking component and an operating component. The side impact protection block is switchable between a folded position and an unfolded position, so that the side impact protection block is closely fitted with or at least partially protrudes from the lateral wing. The locking component is switchable between a locking position and a releasing position, so that the side impact protection block is restrained from leaving from the unfolded position or allowed to pivot from the unfolded position to the folded position. The operating component can drive the locking component to move toward the releasing position.

38 Claims, 21 Drawing Sheets

(58) Field of Classification Search
USPC .................................................. 297/216.11
See application file for complete search history.

(56) References Cited

U.S. PATENT DOCUMENTS

| | | | |
|---|---|---|---|
| 4,685,741 A | 8/1987 | Tsuge et al. | |
| 5,083,837 A | 1/1992 | Roach | |
| 5,800,012 A | 9/1998 | Ziegler | |
| 5,806,924 A | 9/1998 | Gonas | |
| 5,845,968 A | 12/1998 | Lovie | |
| 6,042,182 A | 3/2000 | Geis et al. | |
| 6,126,233 A | 10/2000 | Gaetano et al. | |
| 6,149,489 A | 11/2000 | Johnson | |
| 6,196,629 B1 | 3/2001 | Onishi et al. | |
| 6,394,633 B1 | 5/2002 | Perez | |
| 6,428,096 B2 | 8/2002 | Reitze | |
| 6,428,099 B1 | 8/2002 | Kain | |
| 6,554,358 B2 | 4/2003 | Kain | |
| 6,561,684 B2 | 5/2003 | Reitze et al. | |
| 6,705,676 B1 | 3/2004 | Berringer et al. | |
| 7,059,677 B2 | 6/2006 | Balensiefer et al. | |
| 7,090,294 B2 | 8/2006 | Balensiefer, II et al. | |
| 7,201,444 B2 | 4/2007 | Schimmoller et al. | |
| 7,246,854 B2 | 7/2007 | Dingman et al. | |
| 7,360,830 B2 | 4/2008 | Balensiefer et al. | |
| 7,748,782 B2 | 7/2010 | Chen et al. | |
| 7,850,236 B2 | 12/2010 | Chen et al. | |
| 7,887,128 B2 | 2/2011 | Zink et al. | |
| 8,007,043 B1 | 8/2011 | Vuong | |
| 8,052,210 B2 | 11/2011 | Marsden et al. | |
| 8,070,226 B2 | 12/2011 | Dingler et al. | |
| 8,113,579 B2 | 2/2012 | Fiore, Jr. et al. | |
| 8,449,030 B2 | 5/2013 | Powell et al. | |
| 8,490,757 B2 | 7/2013 | Chen et al. | |
| 8,596,718 B2 | 12/2013 | Gaudreau, Jr. et al. | |
| 8,684,456 B2 | 4/2014 | Powell | |
| 8,998,318 B2 | 4/2015 | Gaudreau, Jr. | |
| 9,187,014 B2 | 11/2015 | Finnestad | |
| 9,315,124 B2 | 4/2016 | Lehman et al. | |
| 9,440,562 B2 | 9/2016 | Heisey et al. | |
| 9,475,411 B2 | 10/2016 | Gagnade | |
| 9,573,495 B2 | 2/2017 | Haggmark-Bell | |
| 9,592,751 B2 | 3/2017 | Kirstein | |
| 9,610,868 B2 | 4/2017 | Zhang | |
| 9,703,029 B2 | 7/2017 | Wenzel et al. | |
| 9,789,791 B2 | 10/2017 | Hutchinson et al. | |
| 9,908,444 B2 | 3/2018 | Haas et al. | |
| 10,086,722 B2 | 10/2018 | Denbo et al. | |
| 10,118,510 B2 | 11/2018 | Mcroberts et al. | |
| 10,259,356 B2 | 4/2019 | Lehman et al. | |
| 10,279,723 B2 | 5/2019 | Gaudreau, Jr. | |
| 10,414,297 B2 | 9/2019 | Pos | |
| 10,427,558 B1 | 10/2019 | Dickens | |
| 10,589,643 B2 | 3/2020 | Sack et al. | |
| RE47,971 E | 5/2020 | Tanner et al. | |
| 10,780,857 B1 | 9/2020 | Rajasingham | |
| 10,857,968 B2 | 12/2020 | Chen | |
| 10,933,779 B2 * | 3/2021 | Cui .................... | B60N 2/2812 |
| 10,994,689 B2 | 5/2021 | Chi et al. | |
| 11,147,943 B1 | 10/2021 | Lumpkin et al. | |
| 11,358,500 B2 * | 6/2022 | Cui .................... | B60N 2/4235 |
| 11,560,073 B2 | 1/2023 | Pos | |
| 11,691,544 B2 * | 7/2023 | Cui .................... | B60N 2/4235 |
| | | | 297/250.1 |
| 11,865,953 B2 | 1/2024 | Zhang et al. | |
| 2001/0011838 A1 | 8/2001 | Kassai et al. | |
| 2001/0039696 A1 | 11/2001 | Maciejczyk | |
| 2003/0151282 A1 | 8/2003 | Williams et al. | |
| 2004/0084941 A1 | 5/2004 | Asbach et al. | |
| 2004/0124677 A1 | 7/2004 | Meeker et al. | |
| 2004/0164529 A1 | 8/2004 | Yoshida | |
| 2004/0189068 A1 | 9/2004 | Meeker et al. | |
| 2004/0195815 A1 | 10/2004 | Browne et al. | |
| 2004/0251721 A1 | 12/2004 | Yoshida | |
| 2005/0030188 A1 | 2/2005 | Flanagan et al. | |
| 2005/0104384 A1 | 5/2005 | Kondo et al. | |
| 2005/0173956 A1 | 8/2005 | Balensiefer et al. | |
| 2006/0138844 A1 | 6/2006 | Lavoie et al. | |
| 2006/0208543 A1 | 9/2006 | Spence et al. | |
| 2007/0057545 A1 | 3/2007 | Hartenstine et al. | |
| 2007/0057547 A1 | 3/2007 | Hartenstine et al. | |
| 2007/0216203 A1 | 9/2007 | Rajasingham | |
| 2007/0284925 A1 | 12/2007 | Balensiefer | |
| 2009/0015044 A1 | 1/2009 | Marsilio et al. | |
| 2009/0179470 A1 | 7/2009 | Bass | |
| 2009/0218858 A1 | 9/2009 | Lawall et al. | |
| 2009/0322131 A1 | 12/2009 | Hartenstine et al. | |
| 2010/0007184 A1 | 1/2010 | Griffin et al. | |
| 2010/0026059 A1 | 2/2010 | Amirault et al. | |
| 2010/0032997 A1 | 2/2010 | Gold et al. | |
| 2010/0171349 A1 | 7/2010 | Dellanno | |
| 2010/0194158 A1 | 8/2010 | Mahal et al. | |
| 2010/0231012 A1 | 9/2010 | Marsden et al. | |
| 2010/0301645 A1 | 12/2010 | Uwnawich | |
| 2011/0012398 A1 | 1/2011 | Powell et al. | |
| 2011/0012406 A1 | 1/2011 | Gibson et al. | |
| 2011/0227383 A1 | 9/2011 | Strong | |
| 2011/0252566 A1 | 10/2011 | Rumack | |
| 2012/0007408 A1 | 1/2012 | Freienstein et al. | |
| 2012/0031714 A1 | 2/2012 | Chen et al. | |
| 2012/0146369 A1 | 6/2012 | Gaudreau, Jr. | |
| 2012/0242129 A1 | 9/2012 | Gaudreau, Jr. et al. | |
| 2012/0326476 A1 | 12/2012 | Runk et al. | |
| 2013/0062917 A1 | 3/2013 | Powell | |
| 2013/0082498 A1 | 4/2013 | Doolan, III | |
| 2013/0154318 A1 | 6/2013 | Van et al. | |
| 2013/0320725 A1 | 12/2013 | Conway | |
| 2014/0070597 A1 | 3/2014 | Powell et al. | |
| 2014/0117729 A1 | 5/2014 | Allen et al. | |
| 2014/0246889 A1 | 9/2014 | Strong et al. | |
| 2015/0021962 A1 | 1/2015 | Gagnade | |
| 2015/0091344 A1 | 4/2015 | Tanner et al. | |
| 2015/0336482 A1 | 11/2015 | Pos | |
| 2015/0375641 A1 | 12/2015 | Van Mourik et al. | |
| 2016/0059746 A1 | 3/2016 | Finnestad et al. | |
| 2016/0152164 A1 | 6/2016 | Hass et al. | |
| 2016/0221480 A1 | 8/2016 | Shellenberger | |
| 2017/0057384 A1 | 3/2017 | Pleiman et al. | |
| 2017/0101055 A1 | 4/2017 | Alfaro Fonseca | |
| 2017/0106772 A1 | 4/2017 | Williams et al. | |
| 2017/0129370 A1 | 5/2017 | Chen et al. | |
| 2017/0151894 A1 | 6/2017 | McRoberts et al. | |
| 2017/0203672 A1 | 7/2017 | Johnson et al. | |
| 2017/0291516 A1 | 10/2017 | Tat | |
| 2017/0349065 A1 | 12/2017 | Pleiman et al. | |
| 2018/0361888 A1 | 12/2018 | Campbell et al. | |
| 2019/0070984 A1 | 3/2019 | Schmitz et al. | |
| 2019/0176746 A1 | 6/2019 | Chen | |
| 2019/0193606 A1 | 6/2019 | Cohen et al. | |
| 2019/0241141 A1 | 8/2019 | Sirous | |
| 2020/0101876 A1 | 4/2020 | Cui | |
| 2020/0156515 A1 | 5/2020 | Mizuno et al. | |
| 2020/0223333 A1 | 7/2020 | Mason et al. | |
| 2020/0290489 A1 | 9/2020 | Stacey | |
| 2020/0298732 A1 | 9/2020 | Gandhi et al. | |
| 2020/0339016 A1 * | 10/2020 | Zhang .................. | B60N 2/4235 |
| 2020/0384900 A1 | 12/2020 | Thurn et al. | |
| 2021/0016692 A1 * | 1/2021 | Guo .................... | B60N 2/2887 |
| 2021/0070246 A1 | 3/2021 | Chen | |
| 2021/0078464 A1 | 3/2021 | Gaudreau, Jr. et al. | |
| 2021/0146809 A1 | 5/2021 | Cui | |
| 2021/0229578 A1 | 7/2021 | Peleska et al. | |
| 2021/0284049 A1 * | 9/2021 | Mo ...................... | B60N 2/2872 |
| 2021/0300216 A1 | 9/2021 | Urrea et al. | |
| 2021/0331614 A1 | 10/2021 | Di Censo et al. | |
| 2021/0402894 A1 | 12/2021 | Zeng | |
| 2022/0032825 A1 | 2/2022 | Dinescu et al. | |
| 2022/0055505 A1 | 2/2022 | Guo | |
| 2022/0097576 A1 * | 3/2022 | Zhang .................. | B60N 2/4235 |
| 2022/0097577 A1 | 3/2022 | Thenander et al. | |
| 2022/0111776 A1 | 4/2022 | Mo | |
| 2022/0126732 A1 * | 4/2022 | Zhang .................... | B60N 2/919 |
| 2022/0144168 A1 | 5/2022 | Ito et al. | |
| 2022/0265065 A1 | 8/2022 | Kzaiz et al. | |

(56) References Cited

U.S. PATENT DOCUMENTS

| | | |
|---|---|---|
| 2022/0305974 A1 | 9/2022 | Hsu et al. |
| 2022/0340817 A1 | 10/2022 | Kou et al. |
| 2022/0371483 A1 | 11/2022 | Hasan et al. |
| 2023/0001832 A1 | 1/2023 | Oltman |
| 2023/0202368 A1 | 6/2023 | Zhang |
| 2023/0211709 A1 | 7/2023 | Chen |
| 2023/0234480 A1 | 7/2023 | Keegan et al. |
| 2023/0242016 A1* | 8/2023 | Mo ............... B60N 2/2884 297/216.11 |
| 2023/0271535 A1* | 8/2023 | Mo ............... B60N 2/4235 297/216.11 |
| 2023/0286423 A1* | 9/2023 | Chen ............. B60N 2/2839 |
| 2023/0339373 A1 | 10/2023 | Mo et al. |
| 2023/0365033 A1 | 11/2023 | Vibhuti et al. |
| 2025/0001917 A1 | 1/2025 | Mo et al. |
| 2025/0145064 A1 | 5/2025 | Mo |

FOREIGN PATENT DOCUMENTS

| | | |
|---|---|---|
| CN | 2494289 Y | 6/2002 |
| CN | 201833904 U | 5/2011 |
| CN | 301676572 S | 9/2011 |
| CN | 102271962 A | 12/2011 |
| CN | 102343928 A | 2/2012 |
| CN | 103072497 A | 5/2013 |
| CN | 203032429 U | 7/2013 |
| CN | 302523456 S | 8/2013 |
| CN | 104169126 A | 11/2014 |
| CN | 303003067 | 11/2014 |
| CN | 104602952 A | 5/2015 |
| CN | 105329121 A | 2/2016 |
| CN | 105480128 A | 4/2016 |
| CN | 303723283 | 6/2016 |
| CN | 105774888 A | 7/2016 |
| CN | 105882467 A | 8/2016 |
| CN | 107199923 A | 9/2017 |
| CN | 304347219 | 11/2017 |
| CN | 206841219 U | 1/2018 |
| CN | 206914178 U | 1/2018 |
| CN | 207190848 U | 4/2018 |
| CN | 207190853 U | 4/2018 |
| CN | 108025661 A | 5/2018 |
| CN | 207360133 U | 5/2018 |
| CN | 304708611 | 7/2018 |
| CN | 304734739 | 7/2018 |
| CN | 108437860 A | 8/2018 |
| CN | 207725263 U | 8/2018 |
| CN | 108790970 A | 11/2018 |
| CN | 304906404 | 11/2018 |
| CN | 109131517 A | 1/2019 |
| CN | 208393180 U | 1/2019 |
| CN | 109895664 A | 6/2019 |
| CN | 109927594 A | 6/2019 |
| CN | 209141947 U | 7/2019 |
| CN | 110126773 A | 8/2019 |
| CN | 209274424 U | 8/2019 |
| CN | 110254303 A | 9/2019 |
| CN | 110271464 A | 9/2019 |
| CN | 209441246 U | 9/2019 |
| CN | 110370999 A | 10/2019 |
| CN | 110497826 A | 11/2019 |
| CN | 110588461 A | 12/2019 |
| CN | 110641330 A | 1/2020 |
| CN | 110901483 A | 3/2020 |
| CN | 110936864 A | 3/2020 |
| CN | 110962709 A | 4/2020 |
| CN | 211765091 U | 10/2020 |
| CN | 212827988 U | 3/2021 |
| CN | 306485314 | 4/2021 |
| CN | 217672279 U | 10/2022 |
| CN | 115891784 A | 4/2023 |
| CN | 116080495 A | 5/2023 |
| CN | 116080496 A | 5/2023 |
| CN | 220147189 U | 12/2023 |
| DE | 9218775 U1 | 9/1995 |
| DE | 19723345 C1 | 7/1998 |
| DE | 202012102223 U1 | 7/2012 |
| DE | 202012102471 U1 | 9/2012 |
| DE | 102014016765 A1 | 6/2015 |
| DE | 202015104791 U1 | 11/2015 |
| DE | 102015214910 A1 | 2/2016 |
| DE | 102015113836 A1 | 2/2017 |
| DE | 102021128940 A1 | 8/2022 |
| EP | 0049680 A1 | 4/1982 |
| EP | 0276186 A1 | 7/1988 |
| EP | 1452406 A1 | 9/2004 |
| EP | 2275303 A1 | 1/2011 |
| EP | 2368752 A2 | 9/2011 |
| EP | 2746097 A1 | 6/2014 |
| EP | 3162623 A1 | 5/2017 |
| EP | 2433832 B1 | 10/2018 |
| EP | 3495196 A1 | 6/2019 |
| EP | 3434511 B1 | 11/2019 |
| EP | 3738819 A1 | 11/2020 |
| GB | 2338181 A | 12/1999 |
| GB | 2531121 A | 4/2016 |
| GB | 2536124 A | 9/2016 |
| GB | 2555914 A | 5/2018 |
| GB | 2575642 A | 1/2020 |
| GB | 2581286 A | 8/2020 |
| GB | 2598264 B | 7/2022 |
| JP | H0534963 U | 5/1993 |
| JP | H05034963 U | 5/1993 |
| JP | H07117542 A | 5/1995 |
| JP | 2002240603 A | 8/2002 |
| JP | 2005022596 A | 1/2005 |
| JP | 2007091200 A | 4/2007 |
| JP | 2013256289 A | 12/2013 |
| JP | 2015086655 A | 5/2015 |
| JP | 3198273 U | 6/2015 |
| JP | 2018526279 A | 9/2018 |
| TW | 200711897 A | 4/2007 |
| TW | 201605668 A | 2/2016 |
| TW | 202200418 A | 1/2022 |
| WO | 2005108153 A2 | 11/2005 |
| WO | 2005108153 A3 | 3/2007 |
| WO | 2012104431 A1 | 8/2012 |
| WO | 2015002412 A1 | 1/2015 |
| WO | 2017029272 A1 | 2/2017 |
| WO | 2018109177 A1 | 6/2018 |
| WO | 2019034018 A1 | 2/2019 |
| WO | 2019091919 A1 | 5/2019 |
| WO | 2020011271 A1 | 1/2020 |
| WO | 2020058273 A1 | 3/2020 |
| WO | 2022162049 A1 | 8/2022 |
| WO | 2022219154 A1 | 10/2022 |
| WO | 2022263637 A1 | 12/2022 |
| WO | 2023222920 A2 | 11/2023 |
| WO | 2024083792 A2 | 4/2024 |
| WO | 2024112607 A1 | 5/2024 |

OTHER PUBLICATIONS

Taiwanese Patent No. 110123675—1st Office Action—Nov. 7, 2021, pp. 1-7.

Chinese Application No. 2020106176421—1st Office Action—Nov. 16, 2023, pp. 1-9.

Japanese Application No. 2022-580988—1st Office Action—Feb. 5, 2024, pp. 1-8.

Li Tianjing, Yancheng Industrial Vocational and Technical College, "Structural Design of Multifunctional Child Safety Seat," China Academic Journal Electronic Publishing House, with english abstract, DOI:10.15989/http://www.cnki.net; Apr. 10, 2019; pp. 1-5.

Chinese Application No. 2020106176421; Notice of Allowance dated Apr. 21, 2024; 7 pgs.

Chinese Application No. 202323141561.7; Office Action dated Jun. 14, 2024; 4 pages.

Chinese Office Action for Chinese Application No. 202010177261.6; Report Mail Date Jun. 3, 2023; pp. 1-36 with Machine Translation.

(56) References Cited

OTHER PUBLICATIONS

International Search Report for International Application No. PCT/US2023/080375; International Filing Date: Nov. 17, 2023; Date of Mailing: Apr. 5, 2024; 4 pages.
International Search Report for International Application No. PCT/US2023/080376; International Filing Date: Nov. 17, 2023; Date of Mailing: Mar. 27, 2024; 5 pages.
Invitation To Pay Additional Fees for International Application No. PCT/US2023/080376; International Filing Date: Nov. 17, 2023; Date of Mailing: Jan. 26, 2024; 2 pages.
Invitation To Pay Additional Fees for International Application No. PCT/US2024/029959; International Filing Date: May 17, 2024; Date of Mailing: Jul. 30, 2024; 2 pages.
U.S. Appl. No. 17/198,758; Final Office Action dated Oct. 28, 2022; 13 pages.
U.S. Appl. No. 17/198,758; Non-Final Office Action dated Apr. 1, 2022; 21 pages.
Written Opinion for International Application No. PCT/US2023/080375; International Filing Date: Nov. 17, 2023; Date of Mailing: Apr. 5, 2024; 6 pages.
Written Opinion for International Application No. PCT/US2023/080376; International Filing Date: Nov. 17, 2023; Date of Mailing: Mar. 27, 2024; 21 pages.
International Search Report & Written Opinion for International Application No. PCT/EP2023/055760; International Filing Date: Mar. 7, 2023; Date of Mailing: Jun. 1, 2023; 11 pages.
Invitation To Pay Additional Fees for International Application No. PCT/US2024/036105; International Filing Date: Jun. 28, 2024; Date of Mailing: Sep. 20, 2024; 3 pages.
Invitation To Pay Additional Fees for International Application No. PCT/US2024/036079; International Filing Date: Jun. 28, 2024; Date of Mailing: Sep. 20, 2024; 3 pages.
Invitation To Pay Additional Fees for International Application No. PCT/US2024/037376; International Filing Date: Jul. 10, 2024; Date of Mailing: Sep. 10, 2024; 3 pages.
Taiwanese Application No. 11221283830; Office Action dated Dec. 21, 2023; 22 pages.
Invitiation To Pay Additional Fees for International Application No. PCT/US2024/046120; International Filing Date: Sep. 11, 2024; Date of Mailing: Nov. 29, 2024; 2 pages.
Invitiation To Pay Additional Fees for International Application No. PCT/US2024/046122; International Filing Date: Sep. 11, 2024; Date of Mailing: Nov. 29, 2024; 2 pages.
Invitiation To Pay Additional Fees for International Application No. PCT/US2024/048496; International Filing Date: Sep. 26, 2024; Date of Mailing: Nov. 29, 2024; 3 pages.
Invitiation To Pay Additional Fees for International Application No. PCT/US2024/048498; International Filing Date: Sep. 26, 2024; Date of Mailing: Dec. 3, 2024; 2 pages.
Invitiation To Pay Additional Fees for International Application No. PCT/US2024/048500; International Filing Date: Sep. 26, 2024; Date of Mailing: Dec. 3, 2024; 2 pages.
Invitiation To Pay Additional Fees for International Application No. PCT/US2024/048501; International Filing Date: Sep. 26, 2024; Date of Mailing: Nov. 29, 2024; 2 pages.
CN Office Action; CN Application No. 2020105712120; Date Mailed: Dec. 15, 2023; pp. 1-6.
CN Office Action; CN Application No. 2020105712120; Date Mailed: May 8, 2024; pp. 1-8.
International Search Report for International Application No. PCT/US2024/029959; International Filing Date: May 17, 2024; Date of Mailing: Oct. 30, 2024; 5 pages.
JP Notice of Reasons for Refusal; JP Application No. 2022577733; Date Mailed: Mar. 11, 2024; pp. 1-7.
PCT International Search Report; International Application No. PCT/EP2021/066322; International Filing Date: Jun. 16, 2021; Date Mailed: Oct. 20, 2021; pp. 1-3.
PCT Isr Written Opinion; International Application No. PCT/EP2021/066322; International Filing Date: Jun. 16, 2021; Date Mailed: Oct. 20, 2021; pp. 1-5.
Taiwanese Patent No. 110121676-1st Office Action-Nov. 17, 2021, pp. 1-3.
U.S. Appl. No. 18/010,996; Notice of Allowance dated Oct. 16, 2024; 20 pages.
US Notice of Allowance for U.S. Appl. No. 18/010,996; filed Dec. 16, 2022; Xiaolong Mo; Date Mailed: Oct. 16, 2024; pp. 1-20.
Written Opinion for International Application No. PCT/US2024/029959; International Filing Date: May 17, 2024; Date of Mailing: Oct. 30, 2024; 12 pages.
International Search Report for International Application No. PCT/US2024/048498; International Filing Date: Sep. 26, 2024; Date of Mailing: Feb. 3, 2025; 5 pages.
International Search Report for International Application Np. PCT/US2024/057303; International Filing Date: Nov. 25, 2024; Date of Mailing: Feb. 13, 2025; 2 pages.
Written Opinion for International Application No. PCT/US2024/048498; International Filing Date: Sep. 26, 2024; Date of Mailing: Feb. 3, 2025; 46 pages.
Written Opinion for International Application Np. PCT/US2024/057303; International Filing Date: Nov. 25, 2024; Date of Mailing: Feb. 13, 2025; 6 pages.
International Search Report for International Application No. PCT/US2024/048496; International Filing Date: Sep. 26, 2023; Date of Mailing: Jan. 27, 2025; 6 pages.
Written Opinion for International Application No. PCT/US2024/048496; International Filing Date: Sep. 26, 2023; Date of Mailing: Jan. 27, 2025; 29 pages.
International Search Report for International Application No. PCT/US2024/036079; International Filing Date: Jun. 28, 2024; Date of Mailing: Dec. 18, 2024; 5 pages.
International Search Report for International Application No. PCT/US2024/037376; International Filing Date: Jul. 10, 2024; Date of Mailing: Jan. 10, 2025; 4 pages.
International Search Report for International Application No. PCT/US2024/046120; International Filing Date: Sep. 11, 2024; Date of Mailing: Jan. 24, 2025; 5 pages.
International Search Report for International Application No. PCT/US2024/046122; International Filing Date: Sep. 11, 2024; Date of Mailing: Jan. 28, 2025; 5 pages.
International Search Report for International Application No. PCT/US2024/048500; International Filing Date: Sep. 26, 2024; Date of Mailing: Jan. 31, 2025; 5 pages.
International Search Report for International Application No. PCT/US2024/048501; International Filing Date: Sep. 26, 2024; Date of Mailing: Jan. 27, 2025; 5 pages.
Written Opinion for International Application No. PCT/US2024/036079; International Filing Date: Jun. 28, 2024; Date of Mailing: Dec. 18, 2024; 24 pages.
Written Opinion for International Application No. PCT/US2024/037376; International Filing Date: Jul. 10, 2024; Date of Mailing: Jan. 10, 2025; 24 pages.
Written Opinion for International Application No. PCT/US2024/046120; International Filing Date: Sep. 11, 2024; Date of Mailing: Jan. 24, 2025; 12 pages.
Written Opinion for International Application No. PCT/US2024/046122; International Filing Date: Sep. 11, 2024; Date of Mailing: Jan. 28, 2025; 21 pages.
Written Opinion for International Application No. PCT/US2024/048500; International Filing Date: Sep. 26, 2024; Date of Mailing: Jan. 31, 2025; 103 pages.
Written Opinion for International Application No. PCT/US2024/048501; International Filing Date: Sep. 26, 2024; Date of Mailing: Jan. 27, 2025; 15 pages.
International Search Report for International Application No. PCT/US2024/036105; International Filing Date: Jun. 28, 2024; Date of Mailing: Dec. 10, 2024; 6 pages.
Written Opinion for International Application No. PCT/US2024/036105; International Filing Date: Jun. 28, 2024; Date of Mailing: Dec. 10, 2024; 31 pages.
Taiwanese Application No. 113148294; Office Action with English translation dated Feb. 10, 2025; 34 pages.

(56) References Cited

OTHER PUBLICATIONS

Invitation To Pay Additional Fees for International Application No. PCT/US2025/018832; International Filing Date: Mar. 7, 2025; Date of Mailing: Apr. 25, 2025; 3 pages.
Invitation To Pay Additional Fees for International Application No. PCT/US2025/019359; International Filing Date: Mar. 11, 2025; Date of Mailing: Apr. 25, 2025; 3 pages.
Written Opinion for International Application No. PCT/US2025/019356; International Filing Date: Mar. 11, 2025; Date of Mailing: Jun. 4, 2025; 31 pages.
Written Opinion for International Application No. PCT/US2025/019359; International Filing Date: Mar. 11, 2025; Date of Mailing: Jun. 26, 2025; 14 pages.
International Search Report for International Application No. PCT/US2025/018832; International Filing Date: Mar. 7, 2025; Date of Mailing: Jul. 1, 2025; 4 pages.
International Search Report for International Application No. PCT/US2025/019356; International Filing Date: Mar. 11, 2025; Date of Mailing: Jun. 4, 2025; 2 pages.
International Search Report for International Application No. PCT/US2025/019359; International Filing Date: Mar. 11, 2025; Date of Mailing: Jun. 26, 2025; 4 pages.
Written Opinion for International Application No. PCT/US2025/018832; International Filing Date: Mar. 7, 2025; Date of Mailing: Jul. 1, 2025; 18 pages.
International Preliminary Report On Patentability for International Application No. PCT/US2023/080376; International Filing Date: Nov. 17, 2023; Date of Mailing: Jun. 5, 2025; 22 pages.
CN Office Action with English Translation; CN Appl No. 202422382970.4; Date Mailed: Oct. 11, 2025; pp. 1-9.

* cited by examiner

SIDE IMPACT PROTECTION MECHANISM

CROSS REFERENCE TO RELATED APPLICATIONS

This application is a National Stage application of PCT/EP2021/068021, filed Jun. 30, 2021, which claims the benefit of Chinese Application No. 202010617642.1, filed Jun. 30, 2020, both of which are incorporated by reference in their entirety herein.

TECHNICAL FIELD

The present disclosure relates to a side impact protection system, more specifically, to a side impact protection mechanism attached on a child carrier.

Background

A child car seat can be installed on a vehicle seat, e.g., a car seat, for a child to sit therein to ensure the child's riding safety. Therefore, the child car seat is more and more popular and widely used. Since a lateral collision often happens in a car accident, a child car seat with a side impact protection mechanism is available in the market in order to prevent the child's death or injury in the lateral collision.

The side impact protection mechanism usually includes an operating component, a locking device and a side impact protection block. The side impact protection block can partially protrude from a lateral wing of the child car seat when the protecting block is located at an unfolded position. The side impact protection block can be closely fitted with the lateral wing of the child car seat when the protecting block is located at a folded position. When the operating component is operated, the operating component can drive the locking device to unlock the side impact protection block, so that the side impact protection block can move from the unfolded position to the folded position. However, the convention side impact protection block has complicated structure and difficult operation. Therefore, there is a need to provide an improved side impact protection mechanism.

SUMMARY

Therefore, the present disclosure aims to provide a side impact protection mechanism with simple structure and easy operation.

As will be seen more clearly from the detail description, the claimed side impact protection mechanism is disposed on a lateral wing of a child carrier and includes a side impact protection block, a locking component and an operating component. The side impact protection block is pivotally connected to the lateral wing and switchable between a folded position and an unfolded position relative to the lateral wing. The side impact protection block is closely fitted with the lateral wing when the side impact protection block is located at the folded position, and the side impact protection block at least partially protrudes from the lateral wing when the side impact protection block is located at the unfolded position. The locking component is movably disposed at least partially within the side impact protection block and switchable between a locking position and a releasing position relative to the protecting block. The side impact protection block is restrained from pivoting relative to the lateral wing away from the unfolded position when the locking component is located at the locking position, and the side impact protection block is allowed to pivot relative to the lateral wing from the unfolded position to the folded position when the locking component is located at the releasing position. The operating component is movably disposed on the side impact protection block and configured to drive the locking component to move toward the releasing position.

BRIEF DESCRIPTION OF THE DRAWINGS

These and other objectives of the present disclosure will no doubt become obvious to those of ordinary skill in the art after reading the following detailed description of the preferred embodiment that is illustrated in the various figures and drawings.

In the following, the invention is further illustrated by way of example, taking reference to the accompanying drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "right", "left", "front", "back", etc., is used with reference to the orientation of the Figure(s) being described. The components of the present disclosure can be positioned in a number of different orientations. As such, the directional terminology is used for purposes of illustration and is in no way limiting. Accordingly, the drawings and descriptions will be regarded as illustrative in nature and not as restrictive. Also, the term "couple" or "connect" is intended to mean either an indirect or direct mechanical connection. Thus, if a first device is coupled or connected to a second device, that connection may be through a direct mechanical connection, or through an indirect mechanical connection via other devices and connections.

In order to illustrate technical specifications and structural features as well as achieved purposes and effects of the present disclosure, relevant embodiments and figures are described as follows.

Unless otherwise specified or the context so requires, any reference to a representative side impact protection mechanism 10 embodiment shall be understood to mean and include, respectively, any and all side impact protection mechanism 10-10c embodiments, respectively.

Figure 1:
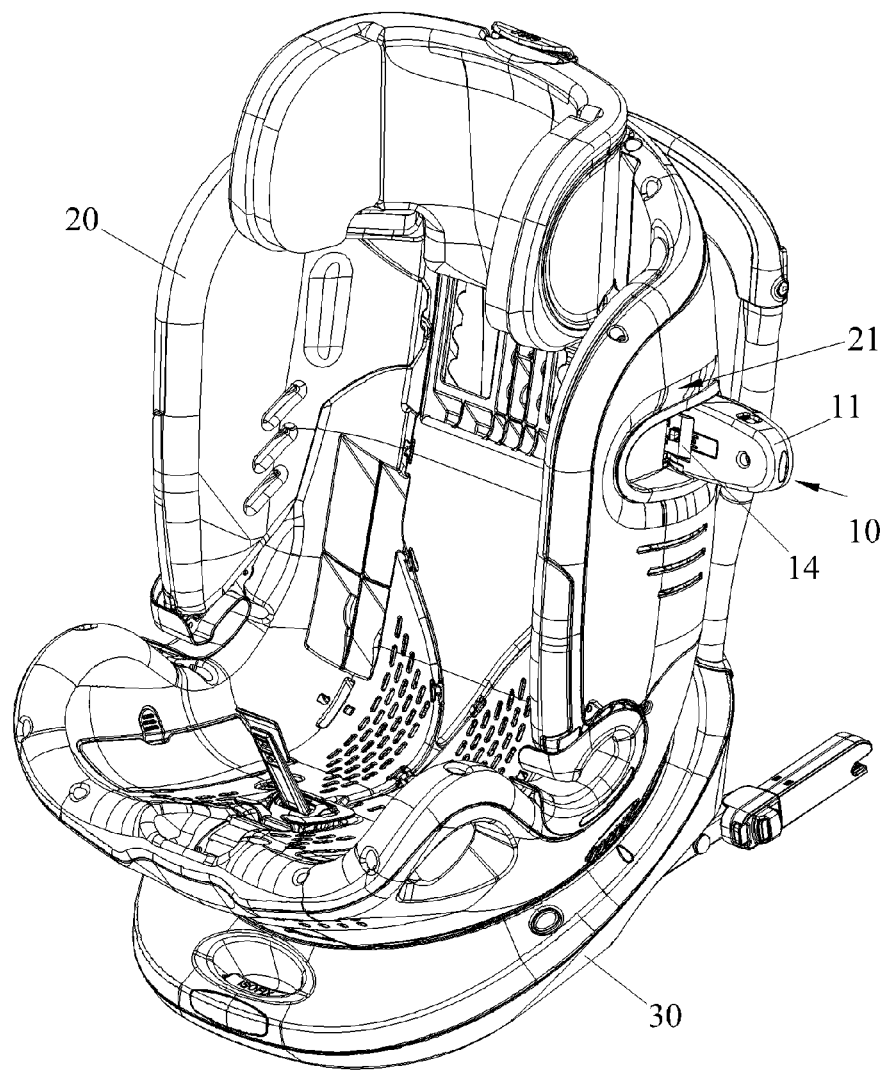
FIG. 1 and FIG. 2 are schematic diagrams of a child car seat in different states according to a first embodiment of the present disclosure.
Figure 2:
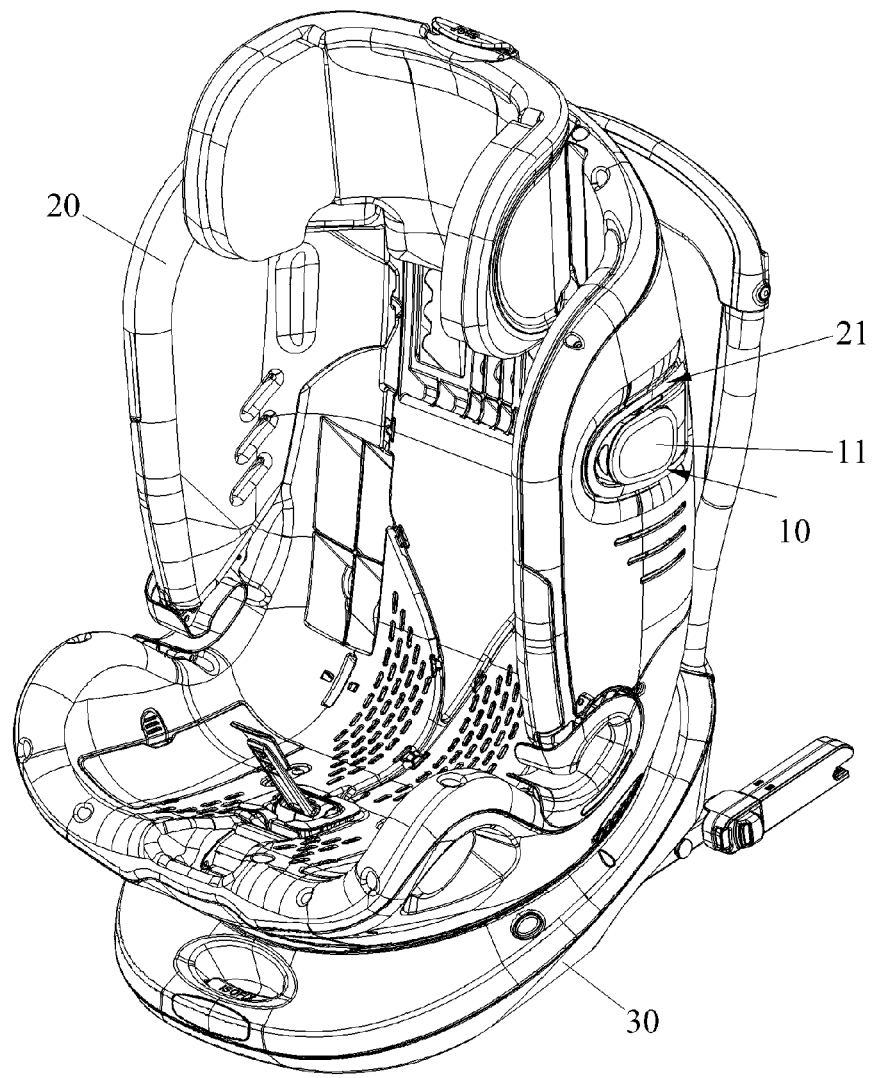
Figure 3:
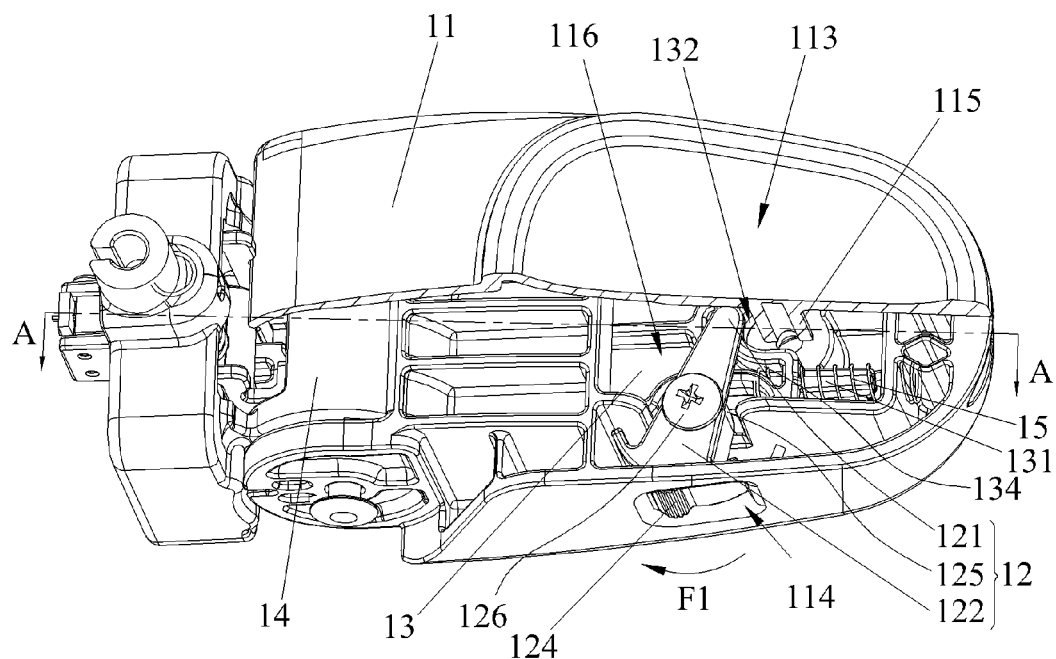
FIG. 3 is a partial internal structural diagram of a side impact protection mechanism according to the first embodiment of the present disclosure.
Figure 4:
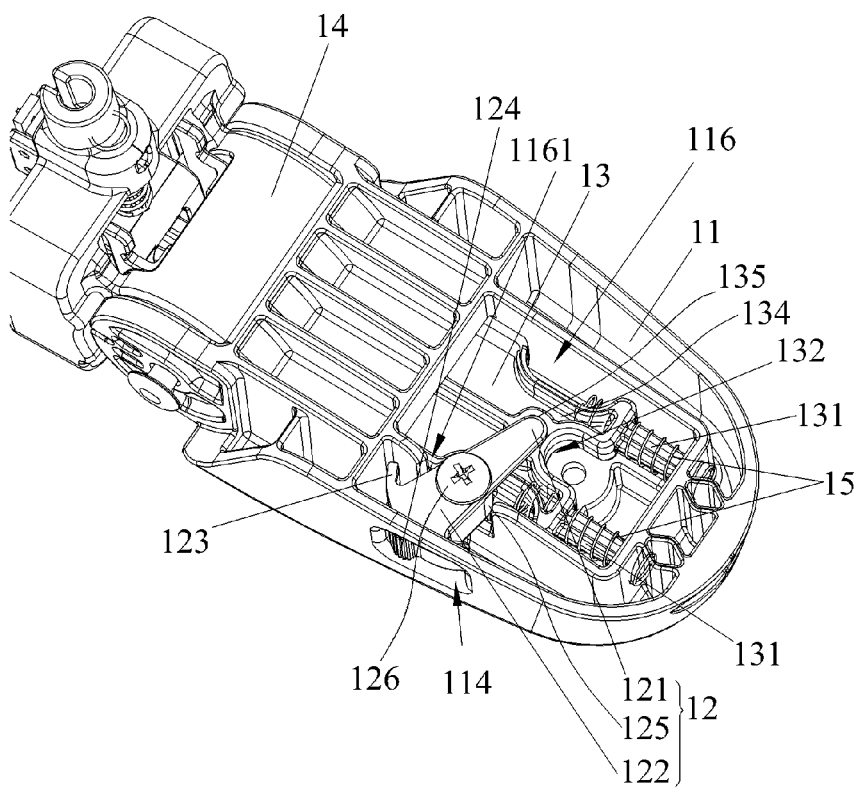
FIG. 4 is a partial diagram of the side impact protection mechanism according to the first embodiment of the present disclosure.
Figure 5:
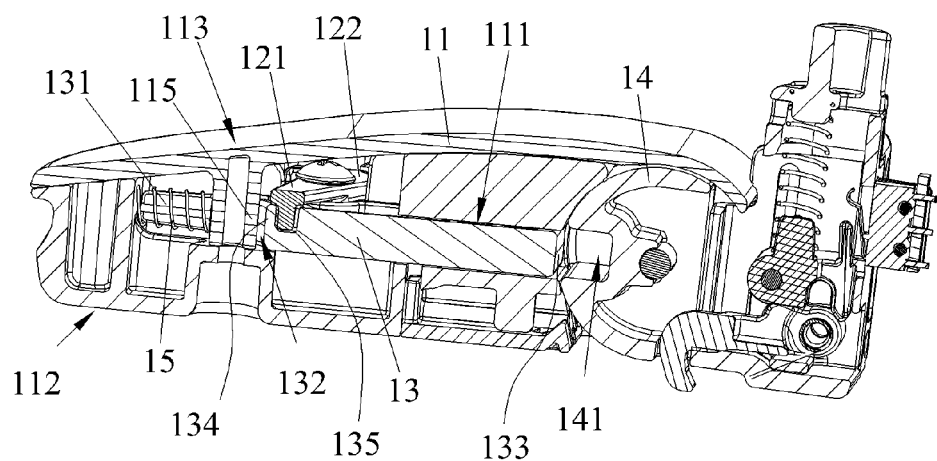
FIG. 5 is a sectional diagram of the side impact protection mechanism along an A-A line shown in FIG. 3 according to the first embodiment of the present disclosure.

Please refer to FIG. 1 to FIG. 5. FIG. 1 and FIG. 2 are schematic diagrams of a child car seat 100 in different states according to a first embodiment of the present disclosure. FIG. 3 is a partial internal structural diagram of a side impact protection mechanism 10 according to the first embodiment of the present disclosure. FIG. 4 is a partial diagram of the side impact protection mechanism 10 according to the first embodiment of the present disclosure. FIG. 5 is a sectional diagram of the side impact protection mechanism 10 along an A-A line shown in FIG. 3 according to the first embodiment of the present disclosure. As shown in FIG. 1 to FIG. 5, the exemplary or representative child car seat 100 which is a child carrier installed on a vehicle seat of a vehicle, e.g., a car seat (or passenger seat) of a car, includes two side impact protection mechanisms 10, a seat 20 and a base 30. The base 30 can be affixed on the vehicle seat by a vehicle belt or an International Standards Organization FIX (ISOFIX) device. The seat 20 is removably installed or fixed on the base 30, and a child sits therein. The two side impact protection mechanisms 10 are disposed on two opposite lateral wings 21 of the seat 20 for buffering lateral impacts along any lateral direction to provide better protection for the child in a lateral collision. However, the number and the configuration of the side impact protection mechanism of present disclosure are not limited to this embodiment. Those having skill in the art will recognize that innumerable other designs are available and are substantially equivalent, as illustrated in the various figures, for example and without limitation. For example, in another embodiment, the child car seat can include only one side impact protection mechanism disposed on one of the lateral wings of the seat at one side. Alternatively, in another embodiment, the child car seat can include at least one side impact protection mechanism disposed on at least one lateral wing of the base. Alternatively, in another embodiment, the side impact protection mechanism also can be disposed on a lateral wing of any component of any other child carrier, e.g., the side impact protection mechanism can be disposed on a lateral wing of one of a seat portion and a frame of a child stroller or disposed on a lateral wing of a carrycot body of a child carrycot.

Referring to FIG. 1 to FIG. 2, a representative embodiment of the two side impact protection mechanisms 10 located at the child car seat 100 is presented. Since the two side impact protection mechanisms 10 located at the two opposite sides have symmetrically identical structure, illustration for the side impact protection mechanism 10 at one side is provided as follows. Specifically, the side impact protection mechanism 10 includes a side impact protection block or housing 11 pivotally connected to the lateral wing 21 and switchable between a folded position or configuration as shown in FIG. 2 and an unfolded position or configuration as shown in FIG. 1 relative to the lateral wing 21. When the child car seat 100 is installed on the vehicle seat, the side impact protection block 11 can be unfolded from the folded position to the unfolded position, so that the side impact protection block 11 can at least partially protrude from the lateral wing 21 along a lateral direction. When a lateral collision occurs, the side impact protection block 11 at least partially protruding from the lateral wing 21 along the lateral direction can be collided with a vehicle body firstly, and then the seat 20 or the base 30 can transmit a lateral impact acting on the side impact protection block 11 to other places for buffering the lateral impact and preventing the lateral impact or energy from directly acting on the child sitting in the child car seat 100 to provide better protection for the child in the lateral collision. On the other hand, when the side impact protection block 11 is folded from the unfolded position to the folded position, the side impact protection block 11 can be closely fitted with the lateral wing 21 to reduce an occupied space of the child car seat 100 for easy storage or transportation.

For the first representative side impact protection mechanism 10 embodiment, the side impact protection block 11 includes a fitting surface 112 and a pushing surface 113 opposite to the fitting surface 112. The fitting surface 112 is configured to be closely fitted with the lateral wing 21 when the side impact protection block 11 is located at the folded position, so as to make the structure of the child car seat 100 more compact. Besides, an arc-shaped or curved recess is on the pushing surface 113 for partially accommodating a user's palm to provide comfortable operation when the user pushes the side impact protection block 11 to pivot.

As shown in FIG. 3 to FIG. 5, the side impact protection mechanism 10 further includes an operating component 12 and a locking component 13. The locking component 13 is disposed at least partially within the side impact protection block 11 and switchable (or movable) between a first, locking position or configuration and a second, releasing position or configuration relative to the side impact protection block 11. Those having skill in the art will recognize innumerable variations on how the locking component 13 may be arranged on the side impact protection block 11 (e.g., the locking component 13 could be at least partially or substantially within the side impact protection block 11, for example and without limitation), and all such variations are considered equivalent and within the scope of the disclosure. A moving direction of the locking component 13 is parallel to a longitudinal direction of the side impact protection block 11. When the locking component 13 is located at the locking position, the side impact protection block 11 is restrained from pivoting relative to the lateral wing 21 away from the unfolded position. When the locking component 13 is located at the releasing position, the side impact protection block 11 is allowed to pivot relative to the lateral wing 21 from the unfolded position to the folded position. The operating component 12 is movably or at least partially disposed within the side impact protection block 11 and configured to drive the locking component 13 to move toward the releasing position manipulated by a user. In this embodiment, the moving direction of the locking component 13 is parallel to the longitudinal direction of the side impact protection block 11. When the side impact protection block 11 is located at the unfolded position, the locking component 13 can be driven to move to the locking position along a direction close to the lateral wing 21, so that the side impact protection block 11 is restrained from pivoting relative to the lateral wing 21 away from the unfolded position. On the other hand, when it is desired to fold the side impact protection block 11, the operating component 12 can be operated to drive the locking component 13 to move to the releasing position along a direction away from the lateral wing 21, so that the side impact protection block 11 is allowed to pivot relative to the lateral wing 21 from the unfolded position to the folded position. Therefore, the present disclosure has simple structure as well as easy operation. It should be noticed that the lateral collision and the lateral impact refer to a collision and an impact coming from a lateral side of the child car seat 100 or the vehicle, and normally acting on an end of the side impact protection block 11 away from the lateral wing 21.

More specifically, the locking component 13 is slidably disposed on (or substantially within) the side impact protection block 11, so that the locking component 13 can switch or move between the locking position and the releasing position quickly and smoothly.

As shown in FIG. 1 to FIG. 5, the side impact protection mechanism 10 further includes a fixing base 14 fixedly installed on the lateral wing 21. The fixing base 14 is at least partially cylindrical and includes a locking portion or groove 141 configured to detachably engage with the locking component 13. It should be noted that the fixing base 14 may also have any of myriad shapes and sizes. When the locking component 13 is located at the locking position, the locking component 13 engages with the locking portion 141, so that the side impact protection block 11 is restrained from pivoting relative to the lateral wing 21 away from the unfolded position. Specifically, the locking component 13 is aligned with the locking portion 141 when the side impact protection block 11 is located at the unfolded position. Therefore, when the side impact protection block 11 is located at the unfolded position, the locking component 13 can be driven to engage with the locking portion 141 precisely and quickly, so as to restrain the side impact protection block 11 from pivoting relative to the lateral wing 21 away from the unfolded position. Furthermore, when it is desired to fold the side impact protection block 11, the locking component 13 can be driven by the operating component 12 to quickly disengage from the locking portion 141, so as to allow the side impact protection block 11 to pivot relative to the lateral wing 21 from the unfolded position to the folded position. In this embodiment, the locking portion 141 can be a hole structure, and the locking component 13 can be a plate-shaped or a rod-shaped structure. However, the present disclosure is not limited to this embodiment.

Besides, the side impact protection mechanism 10 further includes at least one recovering component 15 (or first elastic component) disposed between a distal end 134 of the locking component 13 and the side impact protection block 11 and configured to drive the locking component 13 to engage with the locking portion 141. In other words, when the side impact protection block 11 reaches the unfolded position, the locking portion 141 and a proximal end 133 of the locking component 13 are aligned with each other, so that the recovering component 15 can drive the locking component 13 to engage with the locking portion 141. When the side impact protection block 11 has not yet reached the unfolded position, the locking portion 141 and the locking component 13 are not aligned with each other, so that the recovering component 15 can only drive the locking component 13 to abut against an outer wall of the fixing base 14. Specifically, at least one protruding installation column 131 protrudes and extends from the distal end 134 of the locking component 13, and the recovering component 15 is sleeved on the protruding installation column 131, so that the recovering component 15 can be stably disposed between the distal end 134 of the locking component 13 and the side impact protection block 11, wherein the representative protruding installation column 131 has a length that may be less than the length of the recovering component 15, thereby providing space to be compressed within the side impact protection block 11 when in the releasing position. In this embodiment, the recovering component 15 can be a compression spring. However, the present disclosure is not limited to this embodiment. For example, in another embodiment, the recovering component can be a torsional spring or helical coil spring or a magnetic structure.

As shown in FIG. 3 to FIG. 5, a sliding passage or channel 111 is inside the side impact protection block 11. The locking component 13 is slidably disposed on the sliding passage 111. The sliding passage 111 can prevent the locking component 13 from rocking or vibrating relative to the side impact protection block 11 to ensure the locking component 13 to slide stably and smoothly.

In addition, in order to drive the locking component 13 to move toward the releasing position by the operating component 12 in a limited mechanical space, a moving direction of the operating component 12 can be different from the moving direction of the locking component 13. As shown in FIG. 3 to FIG. 5, the operating component 12 of the first embodiment is pivotally installed on the side impact protection block 11. Therefore, the user can pivot the operating component 12 by toggling to drive the operating component 12 to drive the locking component 13 to move toward the releasing position. Specifically, when the operating component 12 is toggled, the operating component 12 can pivotally drive the locking component 13 to move toward the releasing position along the direction away from the lateral wing 21. More specifically, the operating component 12 includes a contacting end 121, an operating end 122 away from the contacting end 121, and a pivoting portion 125. The pivoting portion 125 is pivotally connected to the side impact protection block 11 through a pivoting pin 126, those having skill in the art will recognize that the pivoting portion 125 may be coupled to the side impact protection block 11 and/or pivoting pin 126 in many different ways, and with many different kinds of movement, all of which are considered equivalent and within the scope of the disclosure. The contacting end 121 and the operating end 122 are located at two opposite sides of the pivoting portion 125, the exemplary operating end 122 being abutting the lateral wall of the side impact protection block 11. The contacting end 121 is at least partially coupled to a recess region 135 of the locking component 13. When the operating end 122 is toggled, the operating end 122 drives the operating component 12 to pivotally drive the locking component 13 to move toward the releasing position along the direction away from the lateral wing 21 by the contacting end 121. In the first representative embodiment, a width of the operating component 12 can gradually increase from the contacting end 121 toward the operating end 122, so that the contacting end 121 can be coupled to the locking component 13 easily. In some instances, the operating component 12 of the first embodiment may have a circular sector form factor, but it is possible for the operating component 12 to have any of other myriad different shapes, such as square, rectangular, cross-shaped, etc., provided, however, that the operating component 12 should be pivotably movable through at least a portion of the interior side impact protection block 11 for this type of operating component 12, as discussed below, for representative locking positions or releasing positions.

As shown in FIG. 3 to FIG. 5, a chamber 116, a first opening 114 of the side impact protection block 11 communicated with the chamber 116, and a second opening 1161 of the chamber 16 aligned with the first opening 114 of the side impact protection block 11 are formed on the side impact protection block 11. The operating component 12 is at least partially accommodated in the chamber 116. The operating end 122 includes an outward protruding arc-shaped or c-shaped structure 123 located at a position corresponding to the openings 114, 1161. A protruding portion 124 protrudes from an outer protruding side of the outward protruding arc-shaped structure 123 and is located in the openings 114, 1161. A size of the outward protruding arc-shaped structure 123 can be greater than a size of the openings 114, 1161 for preventing the operating component 12 from leaving from the chamber 116 via the openings 114, 1161. The operating component 12 can be driven to pivot by the protruding portion 124 when the protruding portion 124 is toggled from the releasing position to the locking position and/or vice versa. Specifically, at least one protruding rib protrudes from the protruding portion 124 for increasing friction between the protruding portion 124 and the user's finger to facilitate the aforementioned toggle operation. Besides, in order to prevent delayed recovery of the locking component 13 caused by an excessive travel of the locking component 13, the side impact protection mechanism 10 further includes a restraining component 115 disposed in the side impact protection block 11. In some instances, the restraining component 115 is protruded and extended from the pushing surface 113 within the chamber 116. When the locking component 13 is located at the releasing position, the restraining component 115 can stop the locking component 13 to restrain the locking component 13 from moving further away the lateral wing 21 and to locate (or remain or maintain) the locking component 13 at the releasing position. More specifically, a positioning portion 132 is on the locking component 13. The restraining component 115 can abut against the positioning portion 132 for stopping the locking component 13 from moving when the locking component 13 is located at the releasing position. Since the restraining component 115 can abut against the positioning portion 132 to stop the locking component 13 from moving when the locking component 13 is located at the releasing position, the locking component 13 can stably move relative to the side impact protection block 11 between the locking position and the releasing position. In this embodiment, the positioning portion 132 can be a hole structure. However, the present disclosure is not limited to this embodiment.

Description for the operation of the side impact protection mechanism 10 of this embodiment is provided as follows. When it is desired to fold the side impact protection block 11, the user can toggle the protruding portion 124 along a toggling direction F1 as shown in FIG. 3 to drive the operating component 12 to pivot. When the operating component 12 pivots, the operating component 12 can drive the locking component 13 to move toward the releasing position along the direction away from the lateral wing 21 by the contacting end 121, so as to drive the locking component 13 to resiliently deform or compress the recovering component 15 and disengage from the locking portion 141, for allowing the side impact protection block 11 to pivot relative to the lateral wing 21 away from the unfolded position as shown in FIG. 1. Afterwards, the user can operate the side impact protection block 11 to pivotally fold relative to the lateral wing 21 from the unfolded position as shown in FIG. 1 to the folded position as shown in FIG. 2. Furthermore, when it is desired to unfold the side impact protection block 11, the user can pivotally unfold the side impact protection block 11 from the folded position to the unfolded position. When the side impact protection block 11 has not yet reached the unfolded position, the locking component 13 is not aligned with the locking portion 141, and therefore, the resiliently deformed recovering component 15 can only drive the locking component 13 to abut against the outer wall of the fixing base 14. When the locking component 13 reaches the unfolded position, the locking component 13 is aligned with the locking portion 141 and not abutted by the outer wall of the fixing base 14, and therefore, the resiliently deformed recovering component 15 can drive the locking component 13 to engage with the locking portion 141 for restraining the side impact protection block 11 from pivoting relative to the lateral wing 21 away from the unfolded position and for locating the locking component 13 at the unfolded position, so as to buffer the lateral impact in the lateral collision.

Figure 6:
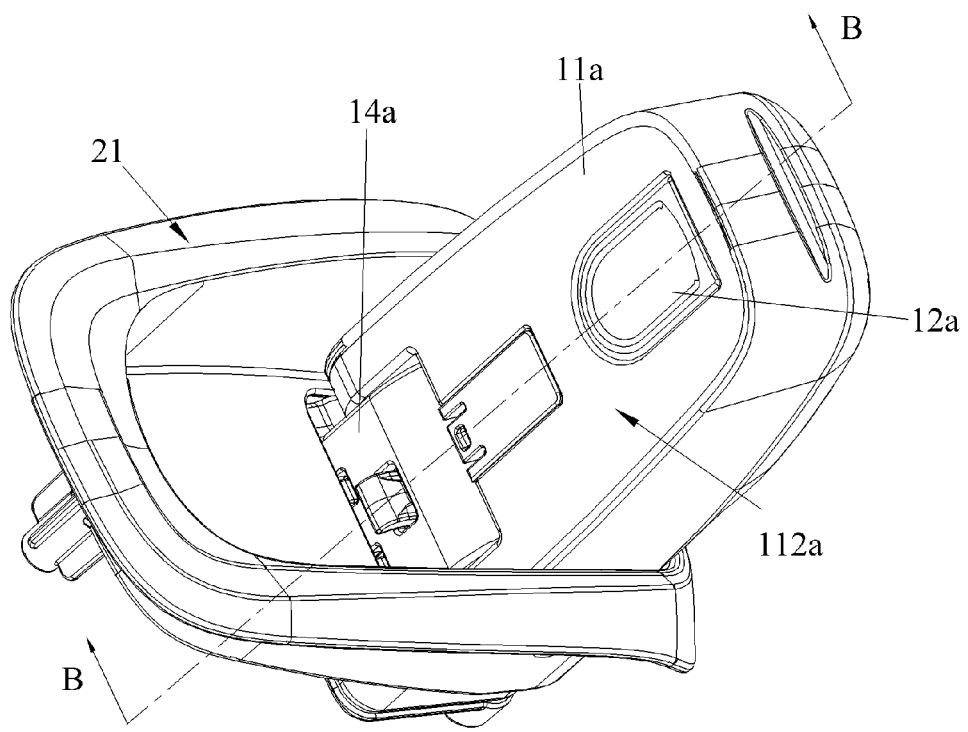
FIG. 6 is a diagram of a side impact protection mechanism according to a second embodiment of the present disclosure.
Figure 7:
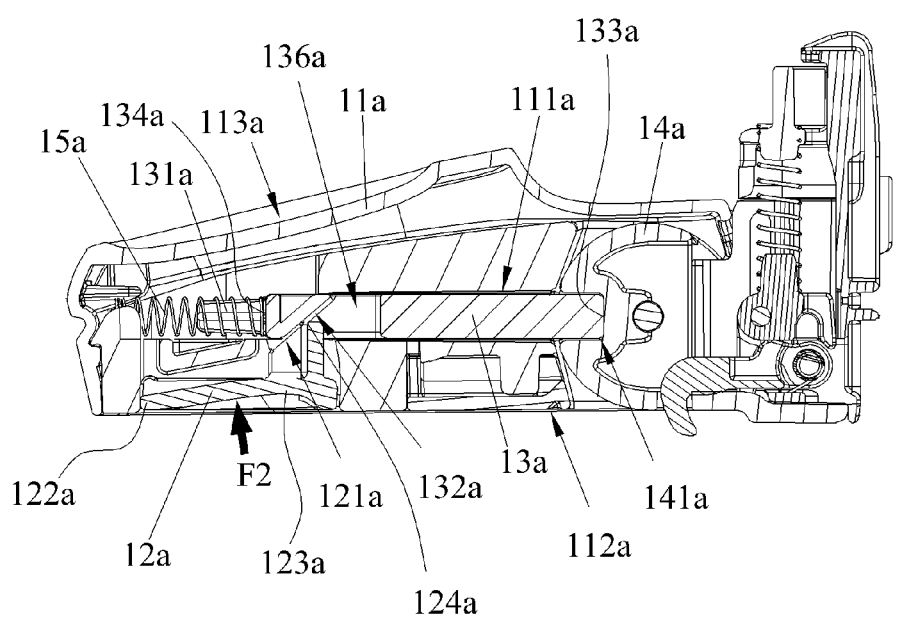
FIG. 7 is a sectional diagram of the side impact protection mechanism along a B-B line shown in FIG. 6 according to the second embodiment of the present disclosure.
Figure 8:
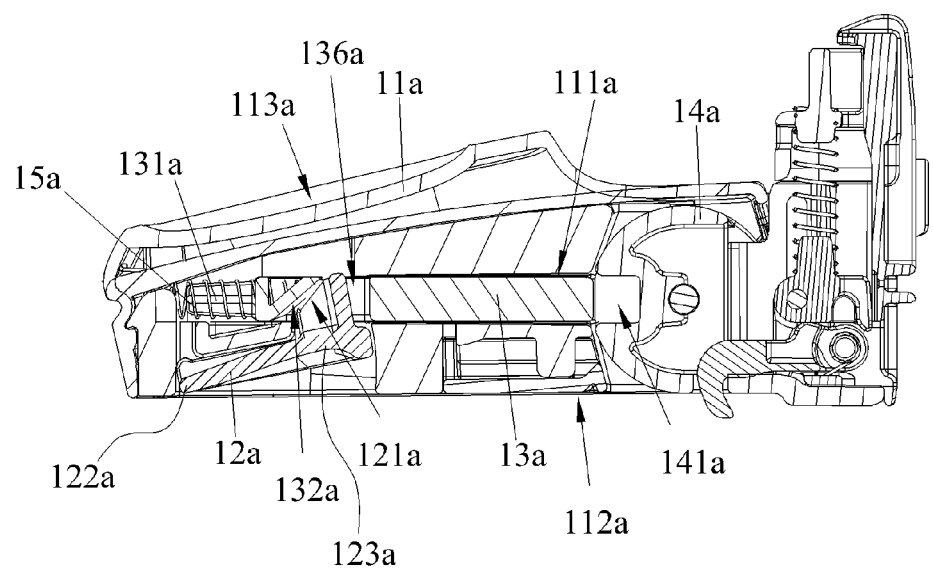
FIG. 8 is a sectional diagram of the side impact protection mechanism as an operating component is pressed according to the second embodiment of the present disclosure.
Figure 9:
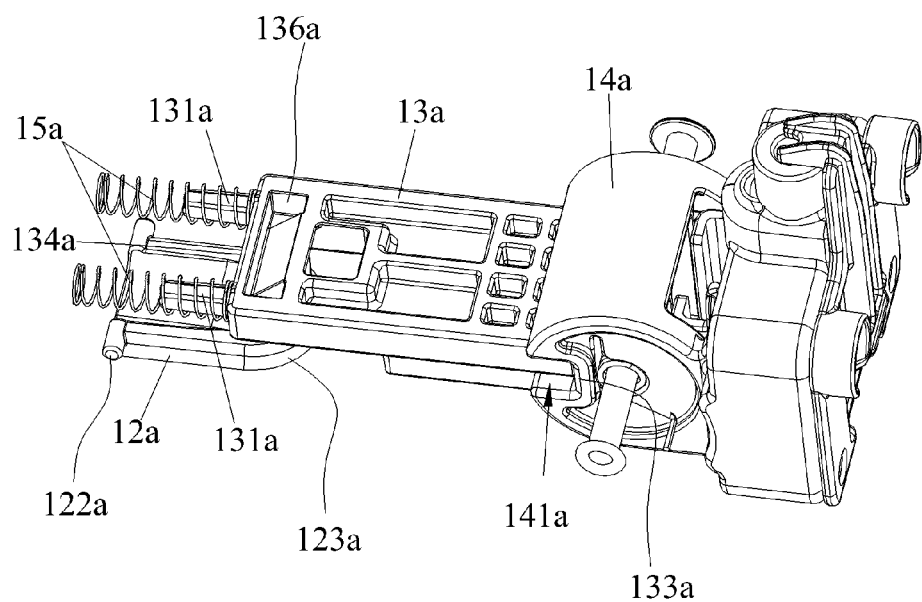
FIG. 9 is a partial diagram of the side impact protection mechanism according to the second embodiment of the present disclosure.

Please further refer to FIG. 6 to FIG. 9. FIG. 6 is a diagram of a side impact protection mechanism 10a according to a second embodiment of the present disclosure. FIG. 7 is a sectional diagram of the side impact protection mechanism 10a along a B-B line shown in FIG. 6 according to the second embodiment of the present disclosure. FIG. 8 is a sectional diagram of the side impact protection mechanism 10a as an operating component 12a is pressed according to the second embodiment of the present disclosure. FIG. 9 is a partial diagram of the side impact protection mechanism 10a according to the second embodiment of the present disclosure. As shown in FIG. 6 to FIG. 9, the side impact protection mechanism 10a of this embodiment and the side impact protection mechanism 10 of the first embodiment have similar structure.

Description for the similar structure is omitted herein for simplicity. The differences between the side impact protection mechanism 10a of this embodiment and the side impact protection mechanism 10 of the first embodiment are provided as follows.

The operating component 12a is configured to be pressed to pivotally drive a locking component 13a to move to the releasing position along the direction away from the lateral wing 21.

The locking component 13a includes a pushed inclined surface 132a inclined relative to a moving direction of the locking component 13a. When the operating component 12a is pressed, the operating component 12a pivotally pushes the pushed inclined surface 132a to drive the locking component 13a to move toward the releasing position along the direction away from the lateral wing 21. In this embodiment, the pushed inclined surface 132a is located adjacent to at least one protruding installation column 131a. However, the present disclosure is not limited to this embodiment.

The operating component 12a includes a pushing inclined surface 121a configured to cooperate with the pushed incline surface 132a for driving the locking component 13a to move toward the releasing position along the direction away from the lateral wing 21.

The operating component 12a further includes a pivoting end 122a and a free end 123a. The pivoting end 122a is pivotally connected to a side impact protection block 11a. The pushing inclined surface 121a is located at the free end 123a.

A representative second embodiment of a side impact protection mechanism 10a is provided as follows. When it is desired to fold the side impact protection block 11a, the user can press the free end 123a of the operating component 12a along a pressing direction F2 as shown in FIG. 7 to drive the operating component 12a to pivot to partially enter into the side impact protection block 11a. The representative operating component 12a may further have a protruding portion or head 124a adjacent to the pushing inclined surface 121a. When the operating component 12a pivots to partially enter into the side impact protection block 11a, the pushing inclined surface 121a pushes the pushed inclined surface 132a to drive the locking component 13a to move toward the releasing position along the direction away from the lateral wing 21 relative to a sliding passage 111a, so as to drive the locking component 13a to resiliently deform at least one recovering component 15a and disengage from a locking portion 141a of a fixing base 14a, for allowing the side impact protection block 11a to pivot relative to the lateral wing 21 away from the unfolded position. In some instances, when the pushing inclined surface 121a pushes the pushed inclined surface 132a, the locking component 13a may have one or more openings 136a adjacent to (or space apart from) the pushed inclined surface 132a. Afterwards, the user can place his/her hand on an arc-shaped recess on a pushing surface 113a to drive a fitting surface 112a of the side impact protection block 11a to be closely fitted with the lateral wing 21. Furthermore, when it is desired to unfold the side impact protection block 11a, the user can pivotally unfold the side impact protection block 11a from the folded position to the unfolded position. When the side impact protection block 11a has not yet reached the unfolded position, the locking component 13a is not aligned with the locking portion 141a, and therefore, the resiliently deformed recovering component 15a can only drive the locking component 13a to abut against an outer wall of the fixing base 14a. When the side impact protection block 11a reaches the unfolded position, the locking component 13a is aligned with the locking portion 141a and not abutted by the outer wall of the fixing base 14a, and therefore, the resiliently deformed recovering component 15a can drive the locking component 13a to engage with the locking portion 141a for restraining the side impact protection block 11a from pivoting relative to the lateral wing 21 away from the unfolded position and for locating the locking component 13a at the unfolded position, so as to buffer the lateral impact in the lateral collision.

Figure 10:
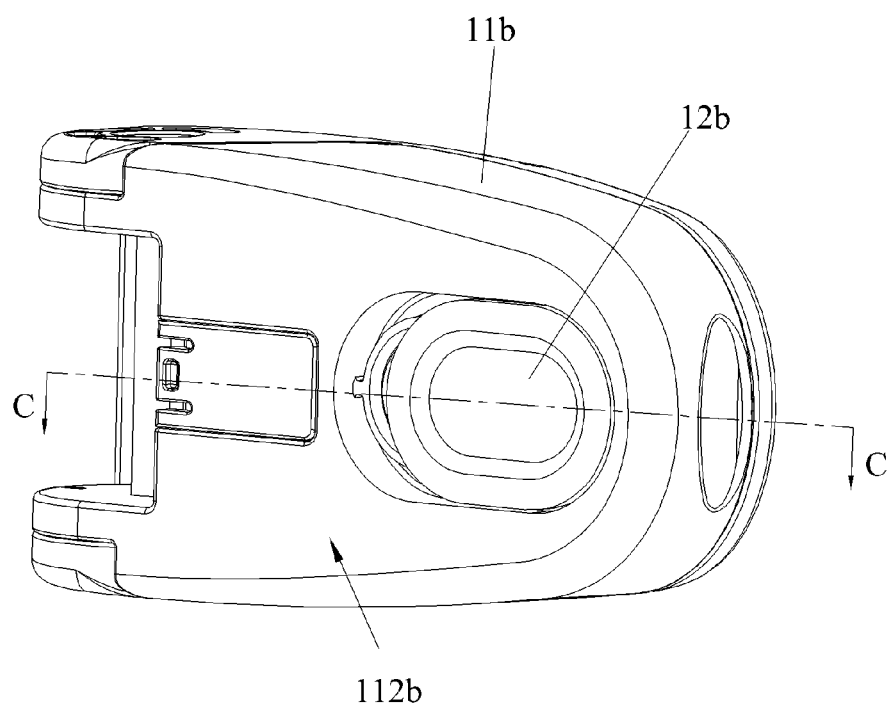
FIG. 10 is diagram of a side impact protection mechanism according to a third embodiment of the present disclosure.
Figure 11:
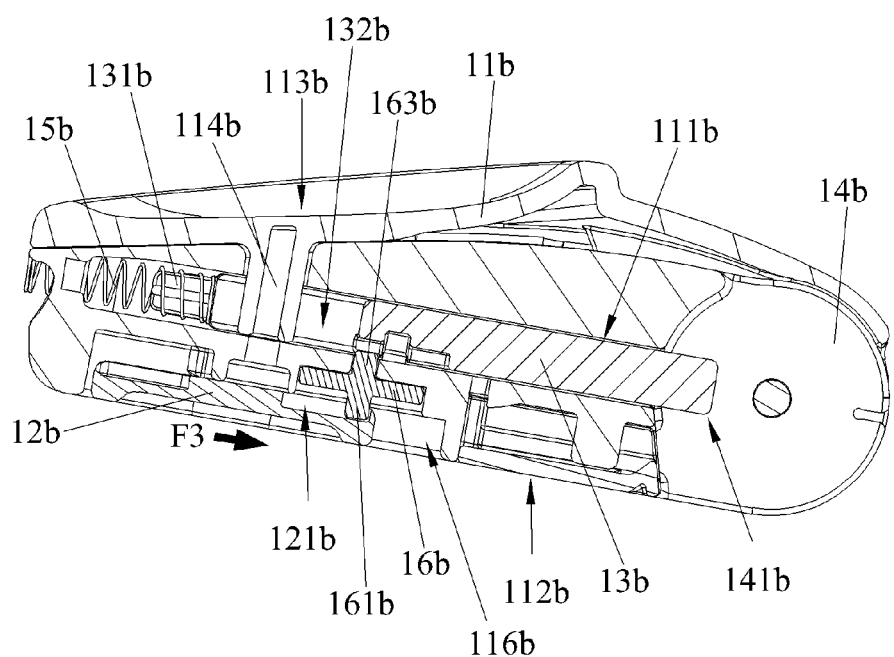
FIG. 11 is a sectional diagram of the side impact protection mechanism along a C-C line shown in FIG. 10 according to the third embodiment of the present disclosure.
Figure 12:
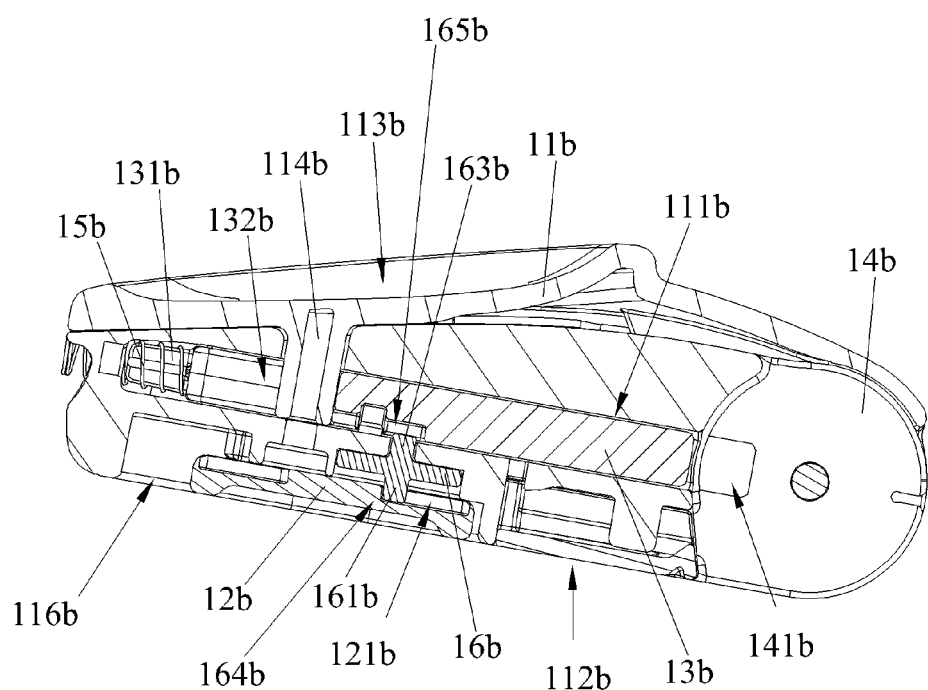
FIG. 12 is a sectional diagram of the side impact protection mechanism as an operating component is pushed according to the third embodiment of the present disclosure.
Figure 13:
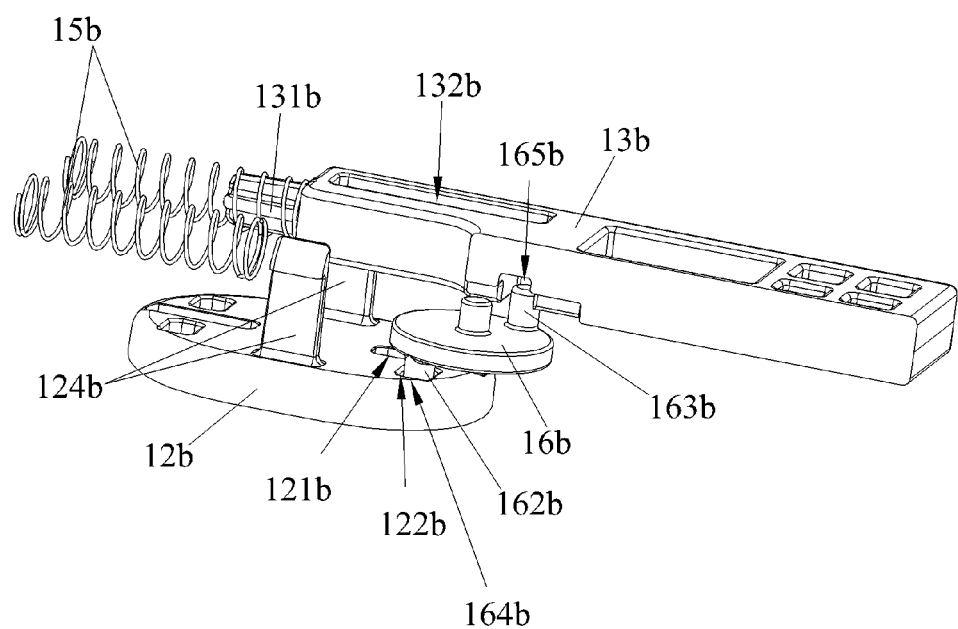
FIG. 13 is a partial diagram of the side impact protection mechanism according to the third embodiment of the present disclosure.
Figure 14:
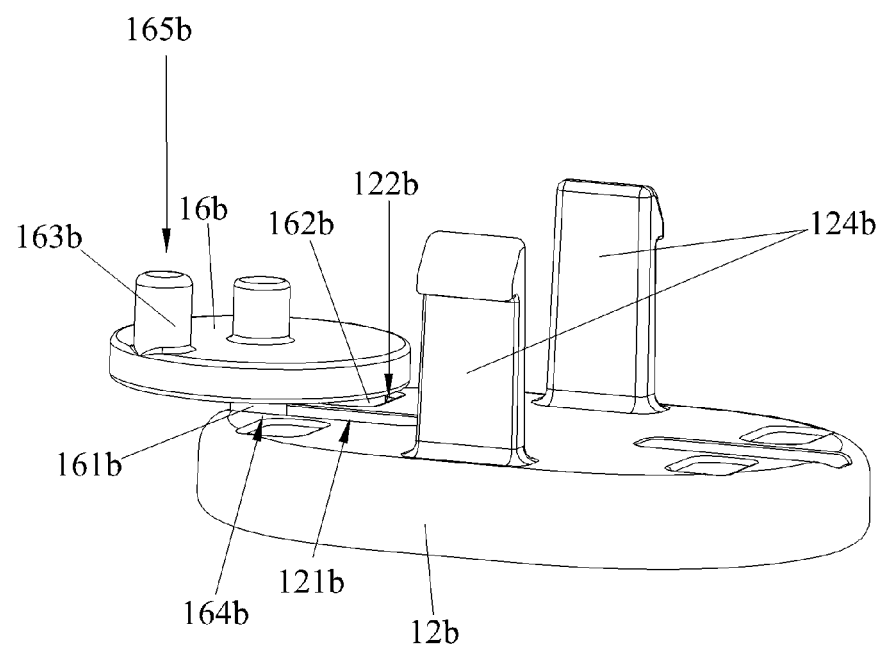
FIG. 14 is a diagram of the operating component and a linking component according to the third embodiment of the present disclosure.

Please further refer to FIG. 10 to FIG. 14. FIG. 10 is diagram of a side impact protection mechanism 10b according to a third embodiment of the present disclosure. FIG. 11 is a sectional diagram of the side impact protection mechanism 10b along a C-C line shown in FIG. 10 according to the third embodiment of the present disclosure. FIG. 12 is a sectional diagram of the side impact protection mechanism 10b as an operating component 12b is pushed according to the third embodiment of the present disclosure. FIG. 13 is a partial diagram of the side impact protection mechanism 10b according to the third embodiment of the present disclosure. FIG. 14 is a diagram of the operating component 12b and a linking component 16b according to the third embodiment of the present disclosure. As shown in FIG. 10 to FIG. 14, the side impact protection mechanism 10b of this embodiment and the side impact protection mechanism 10 of the first embodiment have similar structure. Description for the similar structure is omitted herein for simplicity. The differences between the side impact protection mechanism 10b of this embodiment and the side impact protection mechanism 10 of the first embodiment are provided as follows.

The operating component 12b is slidably disposed on a side impact protection block 11b and configured to be pushed to slidably drive a locking component 13b to the releasing position along the direction away from the lateral wing 21, wherein a sliding direction of the operating component 12b is opposite to a moving direction of the locking component 13b. In this embodiment, when the operating component 12b slides along the direction close to the lateral wing 21, the operating component 12b drives the locking component 13b to the releasing position, and is described in greater detail below. However, the present disclosure is not limited to this embodiment.

The side impact protection mechanism 10b further includes the linking component 16b. At least one first end or lower end 164b of the linking component 16b is installed on the operating component 12b. At least one second end or upper end 165b of the linking component 16b is installed on the locking component 13b. When the operating component 12b moves, the operating component 12b drives the linking component 16b to rotate to drive the locking component 13b to move toward the releasing position. Specifically, the linking component 16b is disposed between the operating component 12b and the locking component 13b. More specifically, the first end 164b of the linking component 16b includes a first leg portion 161b and a second leg portion 162b. The first leg portion 161b and the second leg portion 162b are slidably disposed on the operating component 12b. A sliding direction of the first leg portion 161b is perpendicular to a sliding direction of the second leg portion 162b and parallel to a moving direction of the operating component 12b. When the operating component 12b moves, the linking component 16b can be driven to rotate relative to the side impact protection block 11b by a sliding movement of the first leg portion 161b relative to the operating component 12b and a sliding movement of the second leg portion 162b relative to the operating component 12b.

A first sliding slot 121b and a second sliding slot 122b are on the operating component 12b. A longitudinal direction of the first sliding slot 121b is perpendicular to a longitudinal direction of the second sliding slot 122b and parallel to the moving direction of the operating component 12b. Additionally, the second sliding slot 122b has a transverse direction perpendicular to the longitudinal direction of the first sliding slot 121b. The first leg portion 161b passes through the first sliding slot 121b and is slidable along the longitudinal direction of the first sliding slot 121b, and the second leg portion 162b passes through the second sliding slot 122b Besides, the second end 165b of the linking component 16b includes a third leg portion 163b slidably disposed on the locking component 13b. A sliding direction of the third leg portion 163b is perpendicular to the moving direction of the locking component 13b. When the linking component 16b rotates, the linking component 16b can drive the locking component 13b by the third leg portion 163b. A third sliding slot 123b is on the locking component 13b. A longitudinal direction of the third sliding slot 123b is perpendicular to the moving direction of the locking component 13b. The third leg portion 163b passes through the third sliding slot 123b and is slidable along the longitudinal direction of the third sliding slot 123b.

The operating component 12b includes two positioning arms 124b.

The locking component 13b is located between the two positioning arms 124b.

The side impact protection mechanism 10b further includes a positioning column 114b disposed in the side impact protection block 11b. A through hole 132b is on the locking component 13b. The positioning column 114b passes through the through hole 132b. In this embodiment, the through hole 132b is located adjacent to at least one protruding installation column 131b. However, the present disclosure is not limited to this embodiment.

Description for the operation of the side impact protection mechanism 10b of this embodiment is provided as follows. When it is desired to fold the side impact protection block 11b, the user can push the operating component 12b along a pushing direction F3 as shown in FIG. 11 to drive the operating component 12b to move along the direction close to the lateral wing 21 to drive the linking component 16b to rotate. In some instances, the operating component 12b is slidably disposed within a cavity (or chamber) 116b of a side impact protection block 11b. When the linking component 16b rotates, the linking component 16b drives the locking component 13b to move toward the releasing position along the direction away from the lateral wing 21 relative to a sliding passage 111b, so as to drive the locking component 13b to resiliently deform at least one recovering component 15b and disengage from a locking portion 141b of a fixing base 14b, for allowing the side impact protection block 11b to pivot relative to the lateral wing 21 away from the unfolded position. Afterwards, the user can place his/her hand on an arc-shaped recess on a pushing surface 113b and then push the side impact protection block 11b to pivotally fold relative to the lateral wing 21 from the unfolded position to the folded position to drive a fitting surface of the side impact protection block 11b to be closely fitted with the lateral wing 21. Furthermore, when it is desired to unfold the side impact protection block 11b, the user can pivotally unfold the side impact protection block 11b from the folded position to the unfolded position. When the side impact protection block 11b has not yet reached the unfolded position, the locking component 13b is not aligned with the locking portion 141b, and therefore, the resiliently deformed recovering component 15b can only drive an outer wall of the fixing base 14b. When the side impact protection block 11b reaches the unfolded position, the locking component 13b is aligned with the locking portion 141b and not abutted by the outer wall of the fixing base 14b, and therefore, the resiliently deformed recovering component 15b can drive the locking component 13b to engage with the locking portion 141b for restraining the side impact protection block 11b from pivoting relative to the lateral wing 21 away from the unfolded position and for locating the locking component 13b at the unfolded position, so as to buffer the lateral impact in the lateral collision.

Figure 15:
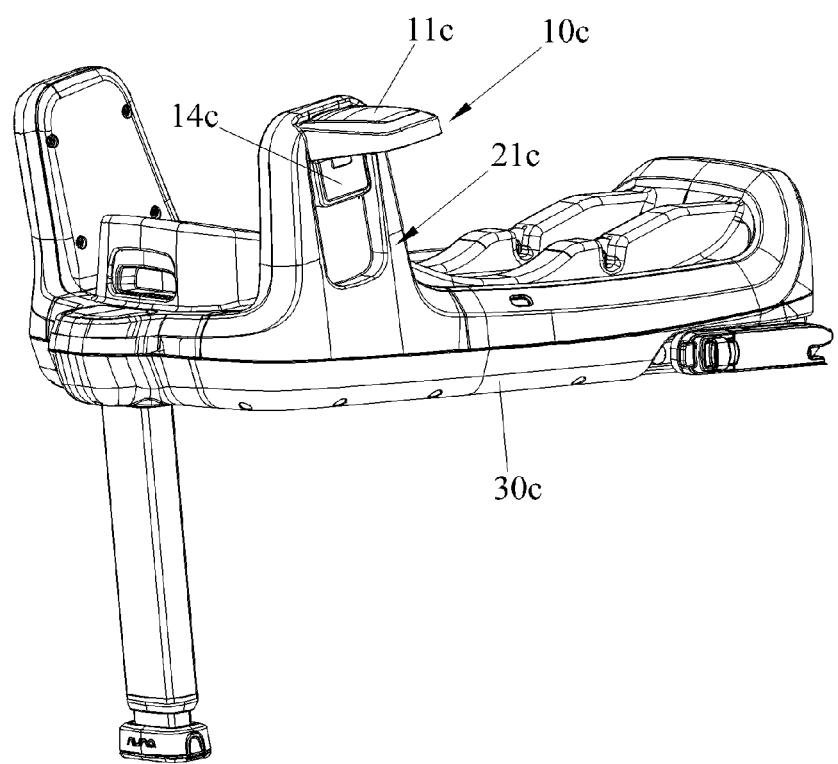
FIG. 15 is a partial diagram of a child car seat according to a fourth embodiment of the present disclosure.
Figure 16:
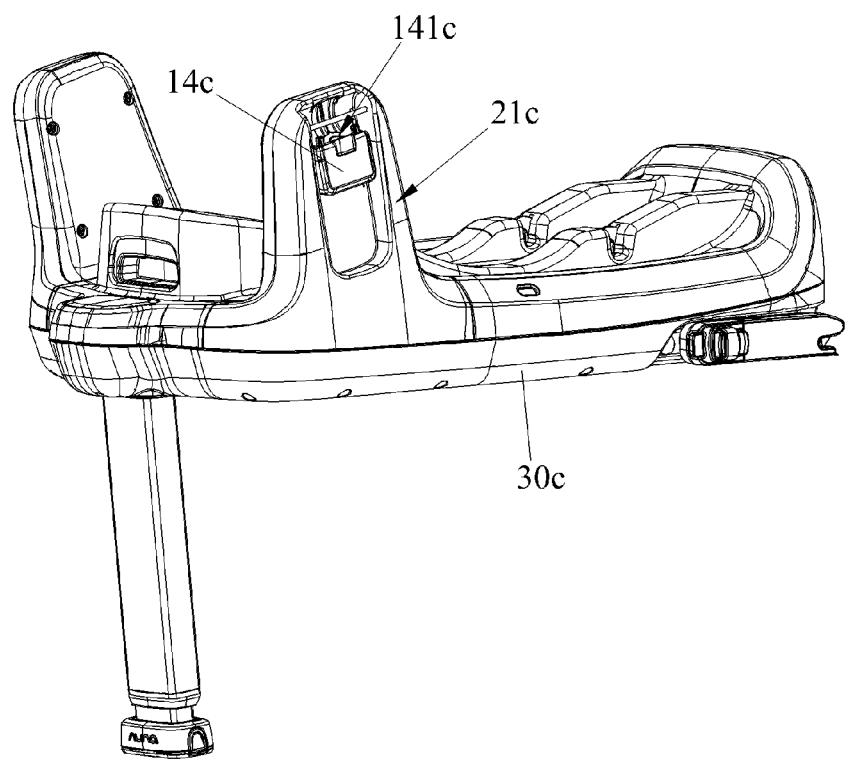
FIG. 16 is another partial diagram of the child car seat according to the fourth embodiment of the present disclosure.
Figure 17:
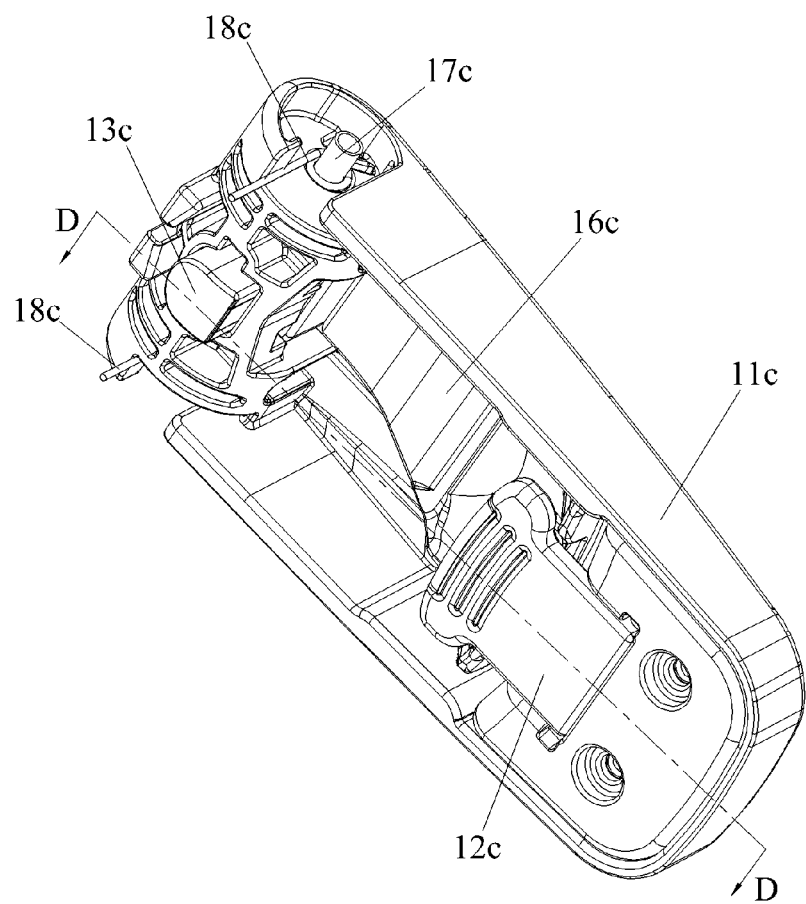
FIG. 17, FIG. 18, and FIG. 19 are partial diagrams of a side impact protection mechanism according to the fourth embodiment of the present disclosure.
Figure 18:
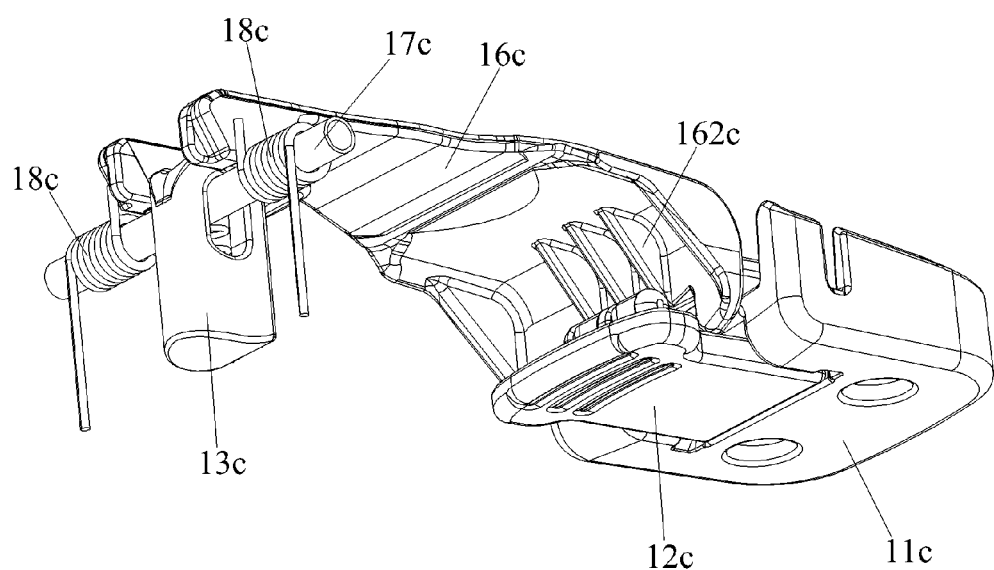
Figure 19:
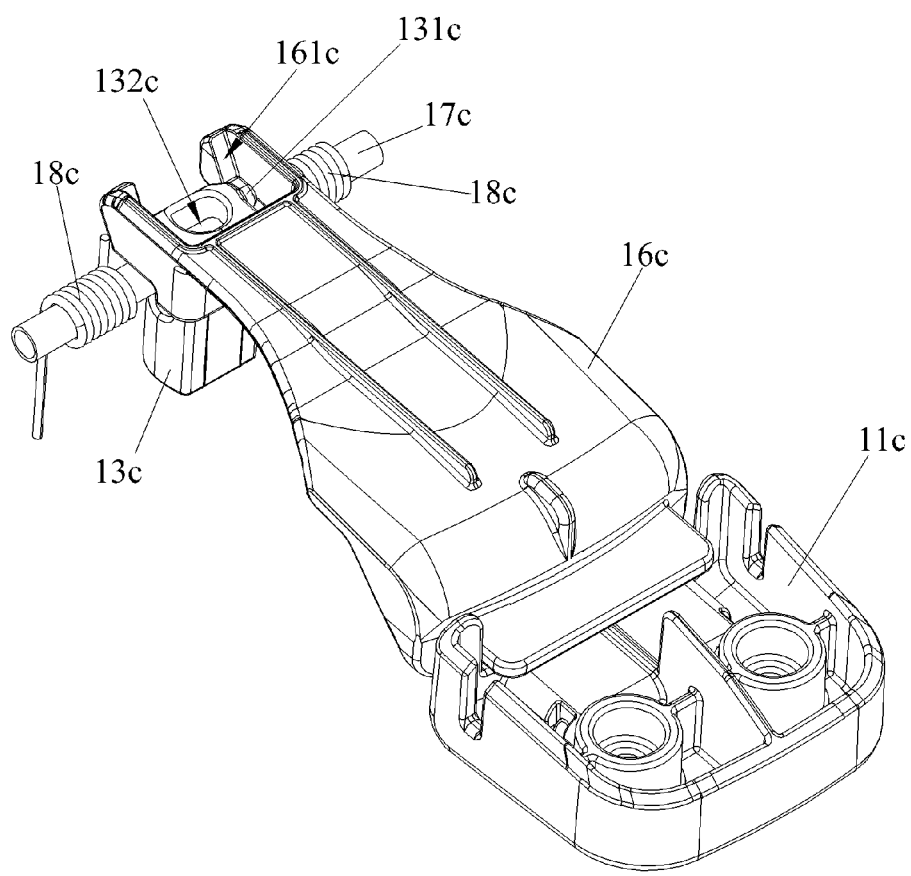
Figure 20:
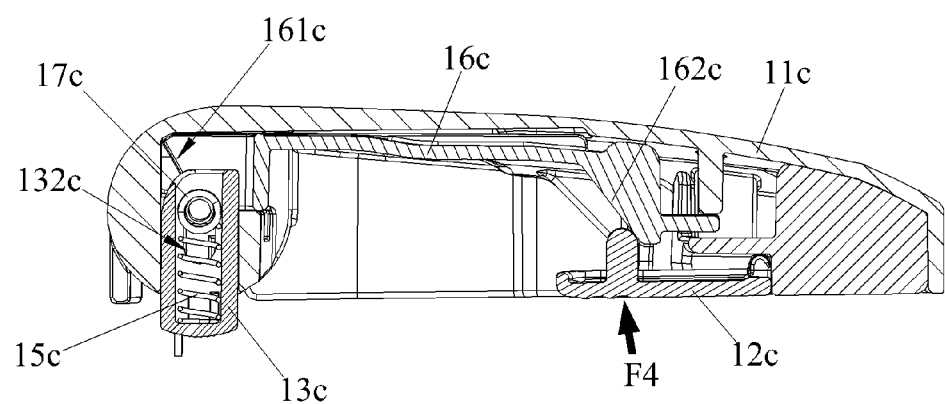
FIG. 20 is a sectional diagram of the side impact protection mechanism along a D-D line shown in FIG. 17 according to the fourth embodiment of the present disclosure.
Figure 21:
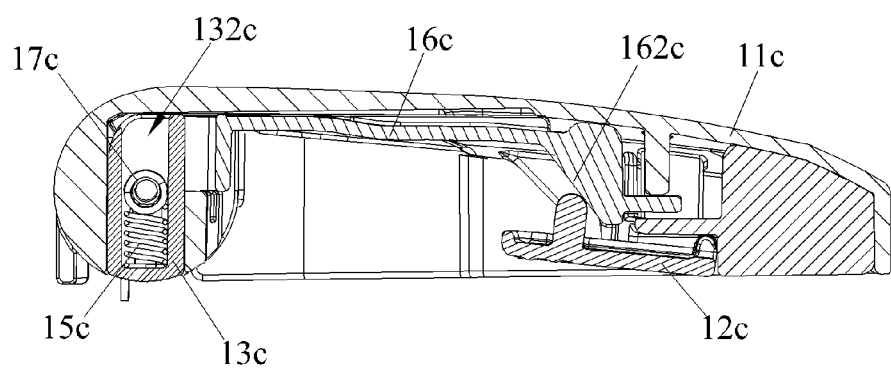
FIG. 21 is a sectional diagram of the side impact protection mechanism as an operating component is pressed according to the fourth embodiment of the present disclosure.

Please further refer to FIG. 15 to FIG. 21. FIG. 15 is a partial diagram of a child car seat 100c (with an optional load leg and without a mountable seat) according to a fourth embodiment of the present disclosure. FIG. 16 is another partial diagram of the child car seat 100c according to the fourth embodiment of the present disclosure. FIG. 17 to FIG. 19 are partial diagrams of a side impact protection mechanism 10c according to the fourth embodiment of the present disclosure. FIG. 20 is a sectional diagram of the side impact protection mechanism 10c along a D-D line shown in FIG. 17 according to the fourth embodiment of the present disclosure. FIG. 21 is a sectional diagram of the side impact protection mechanism 10c as an operating component 12c is pressed according to the fourth embodiment of the present disclosure. As shown in FIG. 15 to FIG. 21, the side impact protection mechanism 10c of this embodiment and the side impact protection mechanism 10 of the first embodiment have similar structure. Description for the similar structure is omitted herein for simplicity. The differences between the side impact protection mechanism 10c of this embodiment and the side impact protection mechanism 10 of the first embodiment are provided as follows.

The side impact protection mechanism 10c is disposed on a lateral wing 21c of a base 30c of the child car seat 100c. A side impact protection block 11c of the side impact protection mechanism 10c is pivotally connected to the lateral wing 21c by a pivoting rod 17c. In order to drive the side impact protection block 11c to recover to the folded position when a locking component 13c is located at the releasing position, the side impact protection mechanism 10c includes a resilient component 18c (or second elastic component) disposed between the side impact protection block 11c and the lateral wing 21c. The resilient component 18c is sleeved on the pivoting rod 17c. A moving direction of the locking component 13c is intersected with a longitudinal direction of the side impact protection block 11c. In this embodiment, the moving direction of the locking component 13c is substantially parallel to a lateral surface of the lateral wing 21c. However, the present disclosure is not limited to this embodiment.

The side impact protection mechanism 10c further includes a linking component 16c slidably disposed on the side impact protection block 11c. A sliding direction of the linking component 16c is intersected with the moving direction of the locking component 13c. The operating component 12c is pivotally connected to the side impact protection block 11c. The operating component 12c drives the locking component 13c to move toward the releasing position by the linking component 16c.

A first end of the linking component 16c includes a driving inclined surface 161c. A protruding column 131c protrudes from the locking component 13c. A protruding direction of the protruding column 131c is intersected with (or extending orthogonally to) the moving direction of the locking component 13c. The protruding column 131c is configured to cooperate with the driving inclined surface 161c, so that the locking component can be driven by a cooperation of the driving inclined surface 161c and the protruding column 131c to move when the linking component 16c slides.

A second end of the linking component 16c includes an inclined structure 162c. When the operating component 12c is pressed to pivot, the operating component 12c can push the inclined structure 162c to drive the linking component 16c to slide.

A locking portion 141c of a fixing base 14c is substantially aligned with the locking component 13c along a vertical direction when the side impact protection block 11c is located at the unfolded position. In this embodiment, the locking portion 141c is a straight hole structure extending along the vertical direction. However, the present disclosure is not limited to this embodiment.

A long hole 132c is on the locking component 13c and penetrates through the locking component 13c. A longitudinal direction of the long hole 132c is parallel to the moving direction of the locking component 13c. The pivoting rod 17c passes through the long hole 132c. At least one recovering component 15c is disposed in the long hole 132c and located between the pivoting rod 17c and the locking component 13c.

Description for the operation of the side impact protection mechanism 10c of this embodiment is provided as follows. When it is desired to fold the side impact protection block 11c, the user can press the operating component 12c along a pressing direction F4 as shown in FIG. 20 to drive the operating component 12c to push the inclined structure 162c to drive the linking component 16c to move along a direction away from the lateral wing 21c. When the linking component 16c moves along the direction away from the lateral wing 21c, the linking component 16c can drive the locking component 13c to move by the cooperation of the driving inclined surface 161c and the protruding column 131c, so as to drive the locking component 13c to resiliently deform the recovering component 15c and disengage from the locking portion 141c of the fixing base 14c, for allowing the side impact protection block 11c to pivot relative to the lateral wing 21c away from the unfolded position. Afterwards, the resilient component 18c can drive the side impact protection block 11c to pivotally fold relative to the lateral wing 21c from the unfolded position to the folded position.

When it is desired to unfold the side impact protection block 11c, the user can pivotally unfold the side impact protection block 11c from the folded position to the unfolded position, so as to resiliently deform the resilient component 18c. When the side impact protection block 11c has not yet reached the unfolded position, the locking component 13c is not aligned with the locking portion 141c, and therefore, the resiliently deformed recovering component 15c can only drive the locking component 13c to abut against an outer wall of the fixing base 14c. When the side impact protection block 11c reaches the unfolded position, the locking component 13c is aligned with the locking portion 141c and not abutted by the outer wall of the fixing base 14c, and therefore, the resiliently deformed recovering component 15c can drive the locking component 13c to engage with the locking portion 141c for restraining the side impact protection block 11c from pivoting relative to the lateral wing 21c away from the unfolded position and for locating the locking component 13c at the unfolded position, so as to buffer the lateral impact in the lateral collision.

In contrast to the prior art, in the present disclosure, when the side impact protection block is located at the unfolded position, the locking component can be driven to move to the locking position, so that the side impact protection block is restrained from pivoting relative to the lateral wing away from the unfolded position. On the other hand, when it is desired to fold the side impact protection block, the operating component can be operated to drive the locking component to move to the releasing position, so that the side impact protection block is allowed to pivot relative to the lateral wing from the unfolded position to the folded position. Therefore, the present disclosure has simple structure as well as easy operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A side impact protection mechanism disposed on a lateral wing of a child carrier, the side impact protection mechanism comprising:

a side impact protection block pivotally connected to the lateral wing and switchable between a folded position and an unfolded position relative to the lateral wing, the side impact protection block being closely fitted with the lateral wing when the side impact protection block is located at the folded position, and the side impact protection block at least partially protruding from the lateral wing when the side impact protection block is located at the unfolded position;

a locking component movably disposed at least partially within the side impact protection block and switchable between a locking position and a releasing position relative to the protecting block, the side impact protection block being restrained from pivoting relative to the lateral wing away from the unfolded position when the locking component is located at the locking position, and the side impact protection block being allowed to pivot relative to the lateral wing from the unfolded position to the folded position when the locking component is located at the releasing position; and an operating component movably disposed on the side impact protection block, the operating component being movable relative to the locking component, wherein movement of the operating component is configured to drive the locking component to move toward the releasing position, wherein the operating component is operable to drive the locking component toward the releasing position, along a direction parallel to a lateral surface of the lateral wing, when the operating component is pressed.

2. The side impact protection mechanism of claim 1, wherein the locking component moves along a direction away from the lateral wing when the locking component moves from the locking position toward the releasing position.

3. The side impact protection mechanism of claim 1, wherein the locking component is slidably disposed in the side impact protection block.

4. The side impact protection mechanism of claim 1, further comprising a fixing base fixedly installed on the lateral wing, the fixing base comprising a locking portion configured to detachably engage with the locking component, and the locking component engaging with the locking portion when the locking component is located at the locking position.

5. The side impact protection mechanism of claim 4, wherein the locking component is aligned with the locking portion when the side impact protection block is located at the unfolded position.

6. The side impact protection mechanism of claim 4, further comprising a recovering component disposed between the locking component and the side impact protection block and configured to drive the locking component to engage with the locking portion.

7. The side impact protection mechanism of claim 6, wherein a protruding installation column protrudes from the locking component, and the recovering component is sleeved on the protruding installation column.

8. The side impact protection mechanism of claim 1, wherein a sliding passage is inside the side impact protection block, and the locking component is slidably disposed on the sliding passage.

9. The side impact protection mechanism of claim 1, wherein a moving direction of the operating component is different from the moving direction of the locking component.

10. The side impact protection mechanism of claim 1, wherein the side impact protection block comprises a fitting surface and a pushing surface opposite to the fitting surface, the fitting surface is configured to be closely fitted with the lateral wing when the side impact protection block is located at the folded position, and an arc-shaped recess is on the pushing surface.

11. The side impact protection mechanism of claim 1, wherein the operating component is pivotally coupled to the side impact protection block.

12. The side impact protection mechanism of claim 1, wherein the operating component is operable to drives the locking component toward the releasing position, along a direction away from the lateral wing, when the operating component is pivoted relative to the side impact protection block.

13. The side impact protection mechanism of claim 1, wherein the operating component comprises a contacting end and an operating end away from the contacting end, the contacting end is coupled to the locking component, and when the operating end is toggled, the operating end drives the operating component to pivotally drive the locking component to move toward the releasing position along a direction away from the lateral wing by the contacting end.

14. The side impact protection mechanism of claim 13, wherein a width of the operating component gradually increases from the contacting end toward the operating end.

15. The side impact protection mechanism of claim 13, wherein a chamber and one or more openings communicated with the chamber are on the side impact protection block, the operating component is partially accommodated in the chamber, the operating end comprises an outward protruding arc-shaped structure located at a position corresponding to the one or more openings, and a protruding portion protrudes from an outer protruding side of the outward protruding arc-shaped structure and is located in the one or more openings.

16. The side impact protection mechanism of claim 15, wherein at least one protruding rib is on the protruding portion.

17. The side impact protection mechanism of claim 1, further comprising a restraining component disposed in the side impact protection block, and the restraining component stopping the locking component from moving when the locking component is located at the releasing position.

18. The side impact protection mechanism of claim 17, wherein a positioning portion is on the locking component, and the restraining component abuts against the positioning portion to stop the locking component from moving when the locking component is located at the releasing position.

19. The side impact protection mechanism of claim 1, wherein the operating component is operable to drives the locking component toward the releasing position, along a direction away from the lateral wing, when the operating component is pressed.

20. The side impact protection mechanism of claim 1, wherein the locking component comprises a pushed inclined surface inclined relative to the moving direction of the locking component, and the operating component is engageable with the pushed inclined surface to drive the locking component toward the releasing position, along a direction away from the lateral wing, when the operating component is pressed.

21. The side impact protection mechanism of claim 20, wherein the operating component comprises a pushing inclined surface configured to cooperate with the pushed inclined surface for driving the locking component to move toward the releasing position along the direction away from the lateral wing.

22. The side impact protection mechanism of claim 21, wherein the operating component further comprises a pivoting end and a free end, the pivoting end is pivotally connected to the side impact protection block, and the pushing inclined surface is located on the free end.

23. The side impact protection mechanism of claim 1, wherein the operating component is slidably disposed within a cavity of the side impact protection block.

24. The side impact protection mechanism of claim 1, wherein the operating component slidably drives the locking component to move toward the releasing position.

25. The side impact protection mechanism of claim 1, wherein a moving direction of the operating component is opposite to the moving direction of the locking component.

26. The side impact protection mechanism of claim 1, further comprising a linking component, a first end of the linking component being installed on the operating component, a second end of the linking component being installed on the locking component, and the operating component driving the linking component to rotate for driving the locking component to move toward the releasing position when then operating component moves.

27. The side impact protection mechanism of claim 26, wherein the linking component is disposed between the operating component and the locking component.

28. The side impact protection mechanism of claim 26, wherein the first end of the linking component comprises a first leg portion and a second leg portion, the first leg portion and the second leg portion are slidably disposed on the operating component, a sliding direction of the first leg portion is perpendicular to a sliding direction of the second leg portion and parallel to a moving direction of the operating component, and the linking component is driven to rotate relative to the side impact protection block by a sliding movement of the first leg portion relative to the operating component and a sliding movement of the second leg portion relative to the operating component when the operating component moves.

29. The side impact protection mechanism of claim 28, wherein a first sliding slot and a second sliding slot are on the operating component, a longitudinal direction of the first sliding slot is perpendicular to a longitudinal direction of the second sliding slot and parallel to the moving direction of the operating component, and the first leg portion and the second leg portion pass through the first sliding slot and the second sliding slot respectively and are slidable along the longitudinal direction of the first sliding slot and the longitudinal direction of the second sliding slot respectively.

30. The side impact protection mechanism of claim 26, wherein the second end of the linking component comprises a third leg portion, the third leg portion is slidably disposed on the locking component, a sliding direction of the third leg portion is perpendicular to the moving direction of the locking direction, and the linking component drives the locking component to move by the third leg portion when the linking component rotates.

31. The side impact protection mechanism of claim 30, wherein a third sliding slot is on the locking component, a longitudinal direction of the third sliding slot is perpendicular to the moving direction of the locking component, and the third leg portion passes through the third sliding slot and is slidable along the longitudinal direction of the third sliding slot.

32. The side impact protection mechanism of claim 1, wherein the operating component comprises two positioning arms, and the locking component is located between the two positioning arms.

33. The side impact protection mechanism of claim 1, further comprising a positioning column disposed in the side impact protection block, a through hole being on the locking component, and the positioning column passing through the through hole.

34. The side impact protection mechanism of claim 1, wherein the side impact protection mechanism is installed on a base of a child car seat including a seat removably installed or fixed on the base.

35. The side impact protection mechanism of claim 1, wherein the side impact protection mechanism is installed on a seat of a child car seat including a base removably installed or fixed on the seat.

36. The side impact protection mechanism of claim 1, wherein a moving direction of the locking component is parallel to a longitudinal direction of the side impact protection block.

37. A side impact protection mechanism disposed on a lateral wing of a child carrier, the side impact protection mechanism comprising:
 a side impact protection block pivotally connected to the lateral wing and switchable between a folded position and an unfolded position relative to the lateral wing, the side impact protection block being closely fitted with the lateral wing when the side impact protection block is located at the folded position, and the side impact protection block at least partially protruding from the lateral wing when the side impact protection block is located at the unfolded position;
 a locking component movably disposed at least partially within the side impact protection block and switchable between a locking position and a releasing position relative to the protecting block, the side impact protection block being restrained from pivoting relative to the lateral wing away from the unfolded position when the locking component is located at the locking position, and the side impact protection block being allowed to pivot relative to the lateral wing from the unfolded position to the folded position when the locking component is located at the releasing position; and
 an operating component movably disposed on the side impact protection block, the operating component being movable relative to the locking component, wherein movement of the operating component is configured to drive the locking component to move toward the releasing position, wherein direction of movement of the locking component is orthogonal to a longitudinal direction of the side impact protection block.

38. A side impact protection mechanism disposed on a lateral wing of a child carrier, the side impact protection mechanism comprising:
 a side impact protection block pivotally connected to the lateral wing and switchable between a folded position and an unfolded position relative to the lateral wing, the side impact protection block being closely fitted with the lateral wing when the side impact protection block is located at the folded position, and the side impact protection block at least partially protruding from the lateral wing when the side impact protection block is located at the unfolded position;
 a locking component movably disposed at least partially within the side impact protection block and switchable between a locking position and a releasing position relative to the protecting block, the side impact protection block being restrained from pivoting relative to the lateral wing away from the unfolded position when the locking component is located at the locking position, and the side impact protection block being allowed to pivot relative to the lateral wing from the unfolded position to the folded position when the locking component is located at the releasing position; and
 an operating component movably disposed on the side impact protection block, the operating component being movable relative to the locking component, wherein movement of the operating component is configured to drive the locking component to move toward the releasing position, wherein the operating component is pivotally coupled to the side impact protection block.

* * * * *